United States Patent
Uhrich et al.

(10) Patent No.: US 10,107,213 B2
(45) Date of Patent: Oct. 23, 2018

(54) METHOD AND SYSTEM FOR EXHAUST GAS RECIRCULATION AND HEAT RECOVERY

(71) Applicant: Ford Global Technologies, LLC, Dearborn, MI (US)

(72) Inventors: Michael James Uhrich, West Bloomfield, MI (US); Daniel Joseph Styles, Canton, MI (US); Karen Evelyn Bevan, Northville, MI (US); William Samuel Schwartz, Pleasant Ridge, MI (US); Chad Allan Baker, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/367,007

(22) Filed: Dec. 1, 2016

(65) Prior Publication Data

US 2018/0156142 A1    Jun. 7, 2018

(51) Int. Cl.
*F02D 41/26* (2006.01)
*F02D 41/00* (2006.01)
(Continued)

(52) U.S. Cl.
CPC .......... *F02D 41/0055* (2013.01); *F01N 1/00* (2013.01); *F01N 3/20* (2013.01); *F01N 13/008* (2013.01);
(Continued)

(58) Field of Classification Search
CPC ............. F02D 41/0055; F02D 41/1458; F02D 41/0077; F02D 41/26; F02D 41/1446;
(Continued)

(56) References Cited

U.S. PATENT DOCUMENTS

| 6,141,961 A | 11/2000 | Rinckel |
| 6,155,042 A * | 12/2000 | Perset ..................... F01N 3/043 60/278 |

(Continued)

FOREIGN PATENT DOCUMENTS

CN         201433815 Y    3/2010

OTHER PUBLICATIONS

Uhrich, Michael James, et al., "Method and System for Exhaust Gas Heat Recovery," U.S. Appl. No. 15/010,382, filed Jan. 29, 2016, 70 pages.
(Continued)

*Primary Examiner* — Hai Huynh
(74) *Attorney, Agent, or Firm* — Julia Voutyras; McCoy Russell LLP

(57) ABSTRACT

Methods and systems are provided for a single heat exchanger coupled to a main exhaust passage upstream of one or more exhaust catalysts or in between two exhaust catalysts for exhaust heat recovery and exhaust gas recirculation (EGR) cooling. In one example, in the pre-catalyst configuration of the heat exchanger, during exhaust heat recovery, a portion of exhaust may be routed via the heat exchanger while the remaining portion of exhaust may be routed directly to the exhaust catalysts, and fueling may be adjusted on a per-cylinder basis to maintain a target exhaust air-fuel-ratio at the exhaust catalysts.

15 Claims, 11 Drawing Sheets

(51) Int. Cl.

| | | |
|---|---|---|
| *F02M 35/104* | (2006.01) | |
| *F02D 41/14* | (2006.01) | |
| *F01N 3/20* | (2006.01) | |
| *F01N 1/00* | (2006.01) | |
| *F01N 13/00* | (2010.01) | |
| *F01N 13/08* | (2010.01) | |
| *F02M 26/22* | (2016.01) | |
| *F02M 26/00* | (2016.01) | |

(52) U.S. Cl.
 CPC ......... *F01N 13/08* (2013.01); *F02D 41/0077* (2013.01); *F02D 41/1458* (2013.01); *F02D 41/26* (2013.01); *F02M 26/22* (2016.02); *F02M 35/104* (2013.01); *F02M 2026/004* (2016.02)

(58) Field of Classification Search
 CPC ........ F01N 3/20; F01N 3/2053; F01N 3/0205; F01N 3/0234; F01N 13/08; F01N 13/008; F01N 1/00; F02M 26/22; F02M 2026/004; F02M 35/104
 USPC ............. 123/672, 676, 693, 568.21, 568.12; 701/103–105, 108; 60/286, 287, 299, 60/300, 303
 See application file for complete search history.

(56) References Cited

U.S. PATENT DOCUMENTS

| | | | | |
|---|---|---|---|---|
| 6,543,427 | B2* | 4/2003 | Kawasaki | F02M 26/16 123/568.12 |
| 6,568,179 | B2* | 5/2003 | Deeba | F01N 3/0814 60/298 |
| 6,708,485 | B2* | 3/2004 | Hinder | F01N 3/0814 60/288 |
| 6,993,428 | B1 | 1/2006 | Gundrum | |
| 7,100,369 | B2* | 9/2006 | Yamaguchi | F01N 5/025 136/203 |
| 8,240,294 | B2 | 8/2012 | Sumilla et al. | |
| 8,341,951 | B2* | 1/2013 | Prior | F01N 3/043 60/287 |
| 8,353,153 | B2* | 1/2013 | Kotrba | F01N 3/0238 60/286 |
| 8,572,962 | B2* | 11/2013 | Steurer | F02M 26/33 60/602 |
| 8,616,187 | B2 | 12/2013 | Yamazaki et al. | |
| 8,635,852 | B2* | 1/2014 | Lupescu | F01N 3/031 60/274 |
| 8,646,262 | B2* | 2/2014 | Magnetto | F01M 5/001 165/51 |
| 8,678,813 | B2* | 3/2014 | Gieshoff | B01D 53/9495 431/3 |
| 9,097,153 | B2* | 8/2015 | Moehlmann | F01N 5/02 |
| 9,140,168 | B2* | 9/2015 | Reynolds | F01N 5/02 |
| 9,664,087 | B2* | 5/2017 | Sloss | F01N 5/02 |
| 9,689,295 | B1* | 6/2017 | Uhrich | F02M 26/33 |
| 9,845,750 | B2* | 12/2017 | Styles | F02D 41/0077 |
| 2008/0241006 | A1* | 10/2008 | Sato | F01N 3/106 422/177 |
| 2013/0031967 | A1* | 2/2013 | Ichimasa | F01N 11/00 73/114.71 |
| 2014/0196454 | A1 | 7/2014 | Ulrey et al. | |
| 2014/0216030 | A1 | 8/2014 | Cockle et al. | |
| 2015/0027104 | A1* | 1/2015 | Bush | F01N 3/0253 60/274 |
| 2015/0121848 | A1 | 5/2015 | Pursifull | |
| 2016/0115910 | A1* | 4/2016 | Bramson | F01N 5/02 123/568.12 |
| 2017/0328263 | A1* | 11/2017 | Uhrich | F01N 5/02 |
| 2018/0038257 | A1* | 2/2018 | Uhrich | F01N 3/2053 |

OTHER PUBLICATIONS

Styles, Daniel Joseph, et al., "Method and System for Exhaust Gas Heat Recovery," U.S. Appl. No. 15/010,537, filed Jan. 29, 2016, 72 pages.

Uhrich, Michael James, et al., "Exhaust Heat Recovery and Hydrocarbon Trapping," U.S. Appl. No. 15/010,688, filed Jan. 29, 2016, 53 pages.

\* cited by examiner

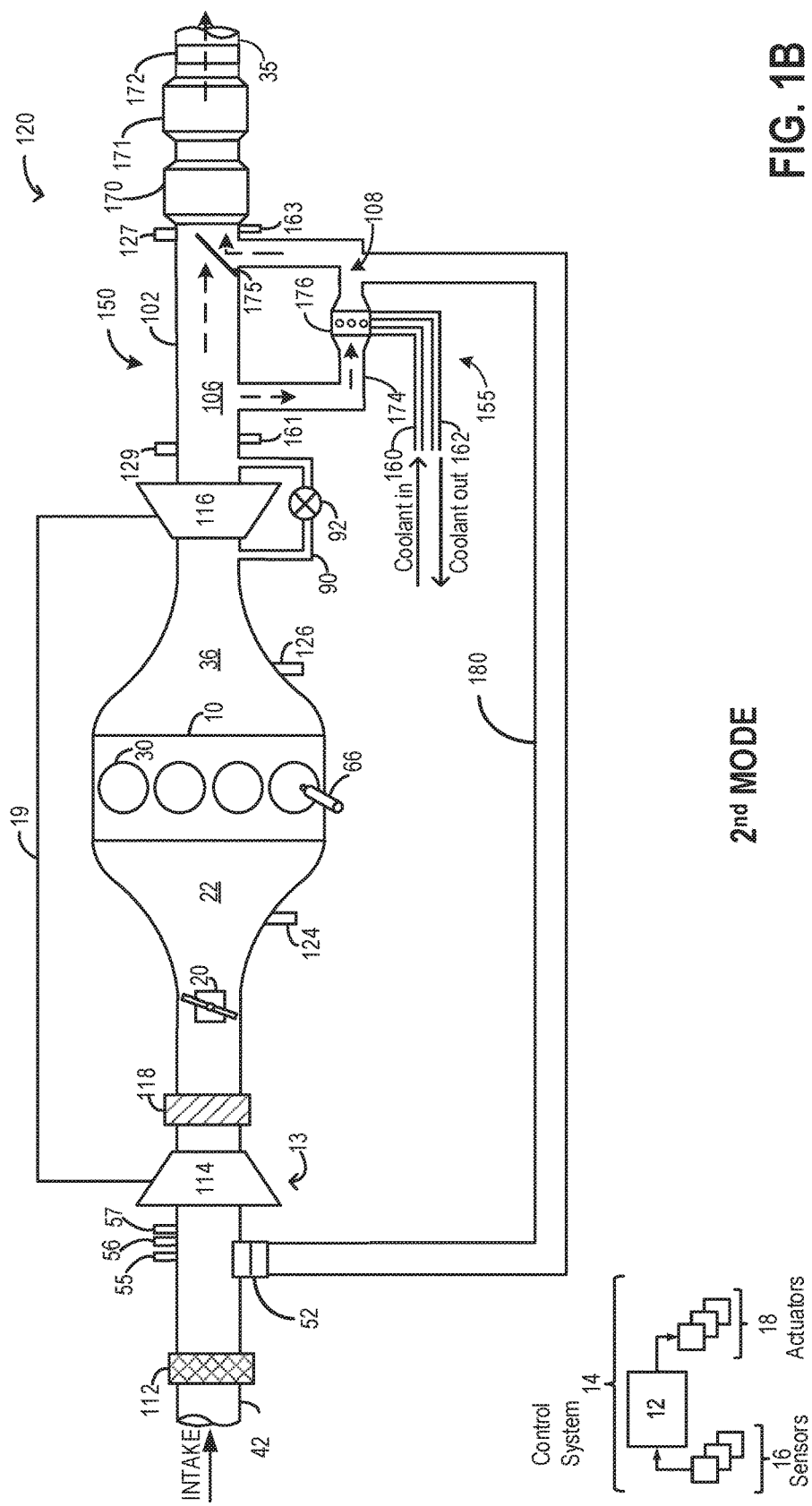

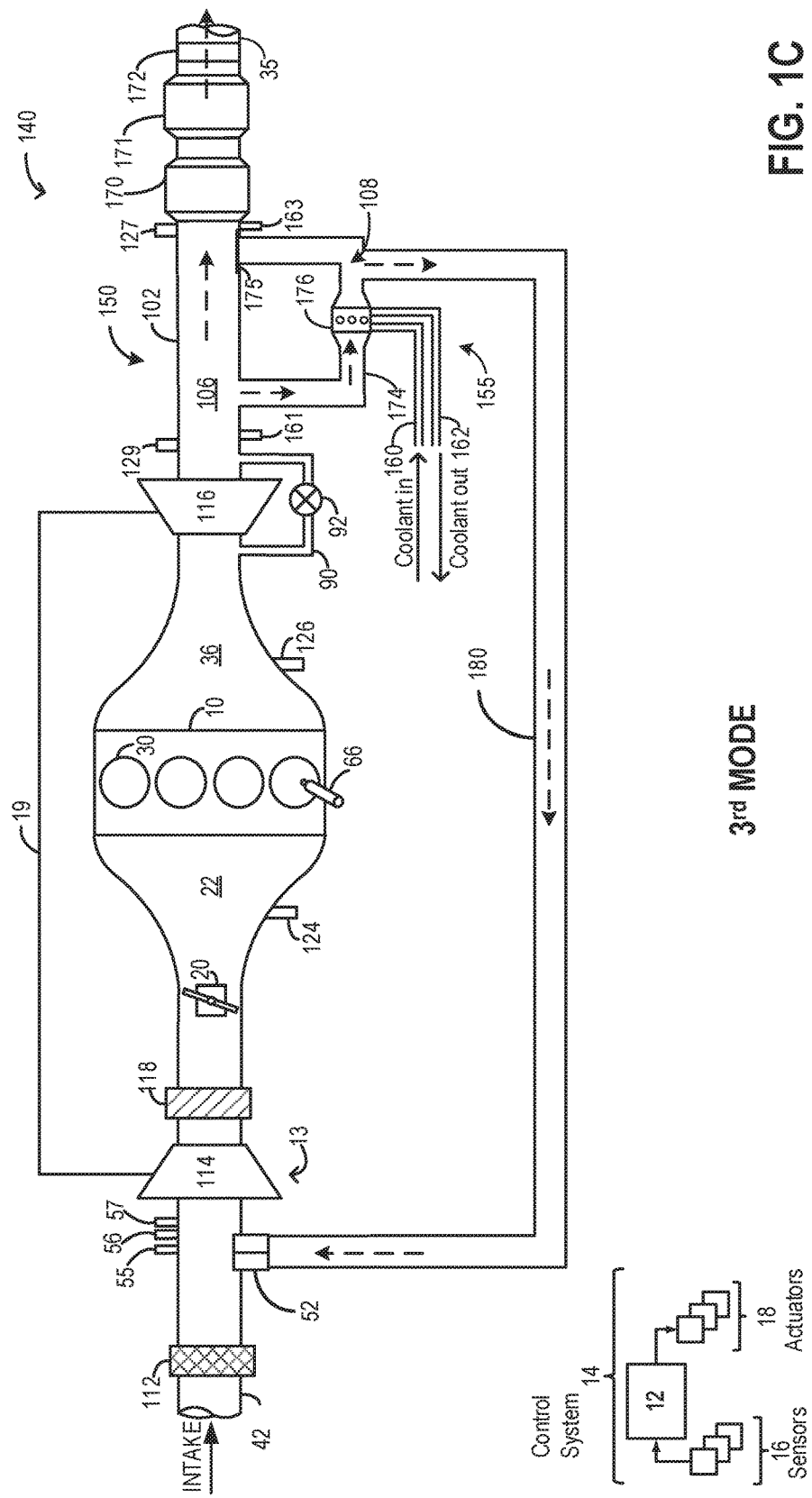

1st MODE

2nd MODE

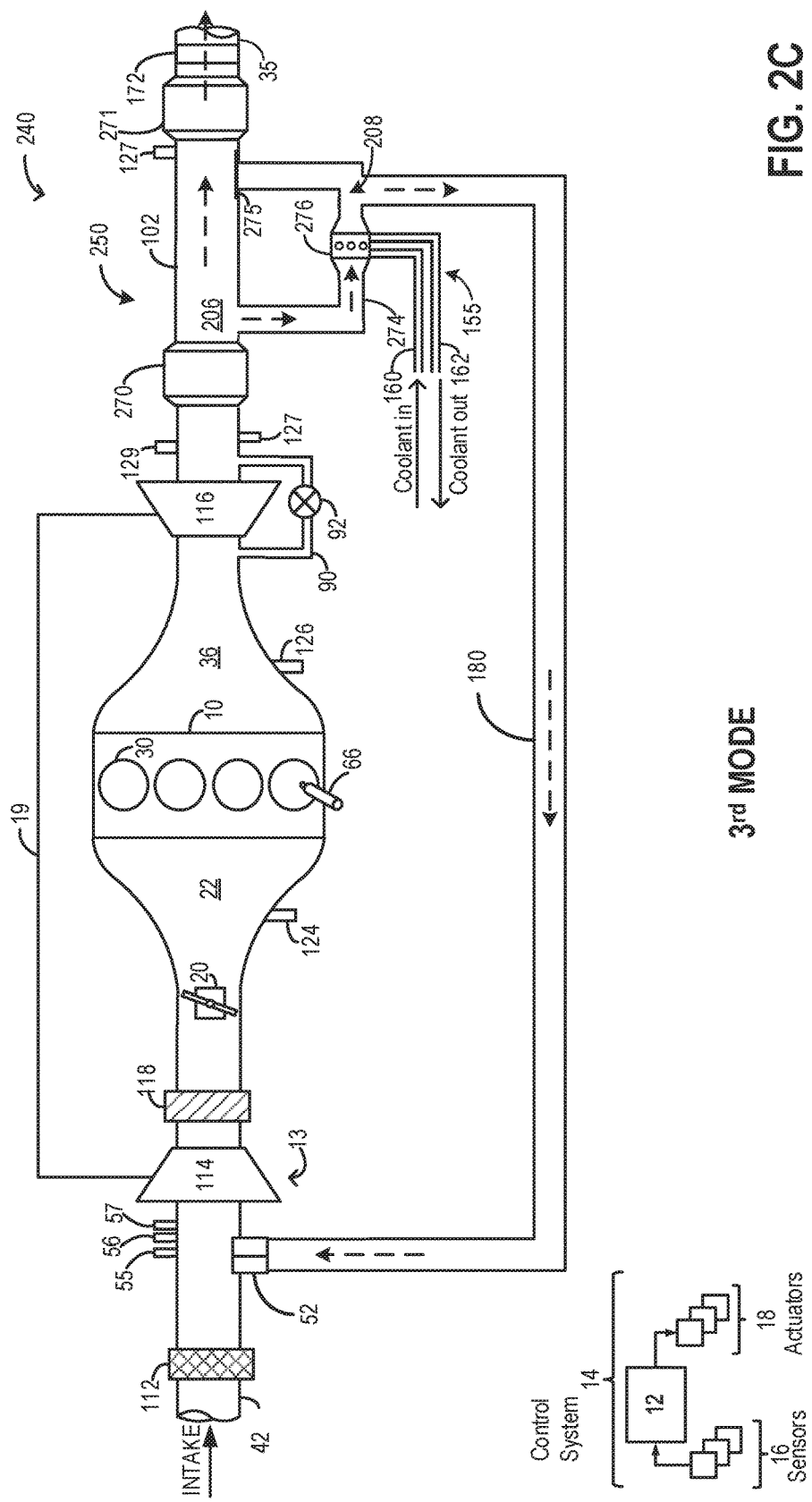

| Operating mode | Engine condition | EGR valve position | Diverter valve position | Exhaust flow through heat exchanger |
|---|---|---|---|---|
| 1 | Cold-start, EGR not desired | Closed | Closed | No |
| 2 | Exhaust heat recovery desired, EGR not desired | Closed | Partially open | Yes |
| 3 | Cold EGR desired, exhaust heat recovery not desired | Open | Closed | Yes |

FIG. 6

METHOD AND SYSTEM FOR EXHAUST GAS RECIRCULATION AND HEAT RECOVERY

FIELD

The present description relates generally to methods and systems for a single heat exchanger for exhaust gas heat recovery and exhaust gas recirculation (EGR) cooling.

BACKGROUND/SUMMARY

Exhaust after-treatment devices, such as an exhaust catalyst coupled to an exhaust of an internal combustion engine, reduce combustion by-products such as carbon monoxide, hydrocarbons, and oxides of nitrogen. For optimal performance efficiency, the temperature of the catalyst needs to be maintained at a temperature higher than the light-off temperature of the catalyst. Towards that end, engines may be configured with an exhaust heat recovery system for recovering heat from exhaust gas. The exhaust heat may be utilized for heating the exhaust catalyst during cold engine conditions, as well as for heating engine coolant which transfers heat to engine components and a vehicle cabin, thereby improving engine efficiency. Engines may be further configured with exhaust gas recirculation capabilities wherein exhaust gas is recirculated to the intake manifold to reduce exhaust NOx emissions and improve fuel economy. An exhaust gas recirculation (EGR) cooler may be coupled to the EGR system to bring down the temperature of the recirculated exhaust gas before it is delivered to the intake manifold.

Various approaches are provided for coordinating the supplying of heat to the exhaust catalysts, exhaust heat recovery, and EGR cooling. In one example, as shown in U.S. Pat. No. 8,240,294 Surnilla et al. discloses an engine system with a high-pressure EGR (HP-EGR) system supplying exhaust from the exhaust manifold, upstream of an exhaust turbine and exhaust catalyst, to the intake manifold downstream of an intake compressor. A HP-EGR cooler may be coupled to the HP-EGR system to cool the exhaust before delivery to the engine intake manifold. During cold-start conditions, a portion of exhaust may be recirculated via the HP-EGR cooler and an engine coolant may be circulated through the cooler to recover the exhaust heat and warm engine coolant. The heat recovered by the engine coolant may be used for heating engine system components. In order to increase the amount of heat recovery, the amount of HP-EGR recirculated to the intake manifold may be increased. Correspondingly, engine operating parameters may be adjusted in order to maintain combustion stability with the increase in the amount of HP-EGR.

However, the inventors herein have recognized potential disadvantages with the above approach. As one example, by harvesting exhaust heat upstream of the catalyst there may be an increase in engine cold-start emissions due to the HP-EGR cooler acting as a heat sink. In particular, during the engine cold-start, engine exhaust heat may be removed at the HP-EGR cooler, lowering the amount of exhaust heat that is received at a downstream exhaust catalyst. As such, this may delay catalyst light-off. Also, as exhaust is routed via a pre-catalyst cooler, there may be undesired changes in a target air-fuel-ratio perturbation reaching the exhaust catalyst. In alternate engine configurations, exhaust heat may be recovered downstream of the exhaust catalyst such that the exhaust heat may be first used for catalyst heating. However, in such an approach, the catalyst may function as a heat sink, and the heat recovered from the exhaust downstream of the catalyst may not be sufficient for engine coolant heating. Also, there may be a loss in the recovered heat due to the extended coolant lines. Further, if EGR is provided by recirculating exhaust from downstream of the catalysts, the reduced backpressure in the exhaust system, downstream of the catalyst, may adversely affect EGR flow to the intake manifold. While two separate heat exchangers may be used, one for exhaust heat recovery downstream of the catalyst, and one for EGR cooling upstream of the catalyst, the presence of multiple heat exchangers adds cost and complexity.

The inventors herein have identified an approach by which the issues described above may be at least partly addressed. One example engine method comprises: flowing a first portion of exhaust into an upstream exhaust catalyst via a heat exchanger in a bypass passage, flowing a second, remaining portion of exhaust into the upstream exhaust catalyst via a main exhaust passage arranged parallel to the bypass passage, and adjusting fueling on a per-cylinder basis as a function of the first portion relative to the second portion to provide a target exhaust air-fuel-ratio at the upstream catalyst. In this way, by positioning a combined exhaust heat exchanger and EGR cooler in an exhaust bypass upstream of the catalyst, the heat exchanger may be bypassed during catalyst heating, and after catalyst light-off, the heat exchanger may be used for exhaust heat recovery and/or EGR cooling.

In one example, an engine system may be configured with a single heat exchanger positioned upstream of one or more exhaust catalysts in an exhaust bypass passage disposed parallel to a main exhaust passage. A diverter valve coupled to a junction of the bypass passage and the main exhaust passage may be used to enable exhaust to be diverted into the bypass passage, and through the heat exchanger or diverted through the main passage to the tailpipe. An EGR passage may be coupled to the bypass passage downstream of the heat exchanger, and an EGR valve may be coupled to the EGR passage to control exhaust flow into the intake manifold. The position of the diverter valve and the EGR valve may be adjusted based on one or more of a catalyst heating request, exhaust heat recovery request, and EGR request. For example, during cold-start conditions, a position of the diverter valve may be adjusted so that exhaust may be directly routed to the exhaust catalysts, bypassing the heat exchanger. After catalyst light-off (activation) is achieved, the position of the diverter valve may be adjusted based on engine heating demands relative to catalyst heating demands so that a first portion of the exhaust may be routed to the catalyst(s) via the heat exchanger housed in the exhaust bypass, while a second (remaining) portion of exhaust may be directly routed to the catalyst(s), bypassing the heat exchanger. During exhaust flow through the heat exchanger, exhaust heat may be transferred to an engine coolant circulating through the heat exchanger, and the hot coolant may then be used for functions such as engine heating and cabin heating. Since the part of the exhaust entering the catalyst flows through a longer route, there may be unintended changes to the air-fuel ratio of the exhaust mixture reaching the catalyst. In particular, a desired exhaust air-fuel-ratio perturbation may be required at the catalyst to maintain catalyst functionality. In order to provide the requested air-fuel-ratio perturbation, combustion air-fuel-ratios may be adjusted on a cylinder-to-cylinder basis based on inputs from oxygen sensors coupled to the main exhaust passage, upstream and downstream of the heat exchanger. This allows, for example, a richer mixture, provided in the first portion of exhaust flowing to the catalyst via the heat exchanger, to be mixed with a leaner mixture, provided in the second portion of exhaust flowing to the catalyst bypassing the heat exchanger, thereby generating the desired exhaust air-fuel-ratio perturbation immediately upstream of the catalyst. When cooled EGR is requested, exhaust may be routed to the intake manifold via the heat exchanger and the EGR valve with the heat exchanger now operating as an EGR cooler. In alternate examples, exhaust may be drawn into the common heat exchanger from a location in between the exhaust catalyst. Exhaust flow through the heat exchanger may be regulated to maintain the temperature of the catalysts above their respective activation temperatures while recovering exhaust heat and/or providing EGR.

In this way, by providing the functions of an EGR cooler and an exhaust gas heat exchanger via a single heat exchanger, cost and component reduction benefits are achieved without limiting the functionality or capability of either system. By positioning the heat exchanger in a pre-catalyst or mid-catalyst location, EGR and engine coolant passage lengths may be shorter allowing for corresponding reductions in EGR transport delays and coolant heat losses. The technical effect of routing exhaust through the catalysts while bypassing the heat exchanger during cold-start conditions is that catalyst light-off will be unaffected, and cold-start emissions quality may be maintained. By routing the exhaust through the heat exchanger located before the catalyst and after catalyst light-off, exhaust heat recovery is increased, allowing for engine and cabin heating. For hybrid vehicles, exhaust heat recovery and expedited engine heating may allow the engine to be shut down within a shorter duration of time. The technical effect of adjusting the cylinder-to-cylinder air-fuel-ratio based on inputs from oxygen sensors coupled to the exhaust passage, upstream and downstream of the heat exchanger, is that phase shifting of exhaust air-fuel ratios may be provided at the catalysts even during heat recovery, thereby improving catalyst functionality. Overall, by expediting catalyst light-off, recovering exhaust heat, and providing cooled EGR using fewer components, emissions quality, engine fuel economy and performance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B shows an example first embodiment of an engine system including a heat exchange system with a pre-catalyst heat exchanger, operating in a second mode.

FIG. 1C shows an example first embodiment of an engine system including a heat exchange system with a pre-catalyst heat exchanger, operating in a third mode.

FIG. 2C shows an example second embodiment of an engine system including a heat exchange system with a mid-catalyst heat exchanger, operating in a third mode.

FIG. 6 shows a table illustrating the different modes of operation of the heat exchange system of FIGS. 1A-1C and FIGS. 2A-2C.

DETAILED DESCRIPTION

Figure 1A:
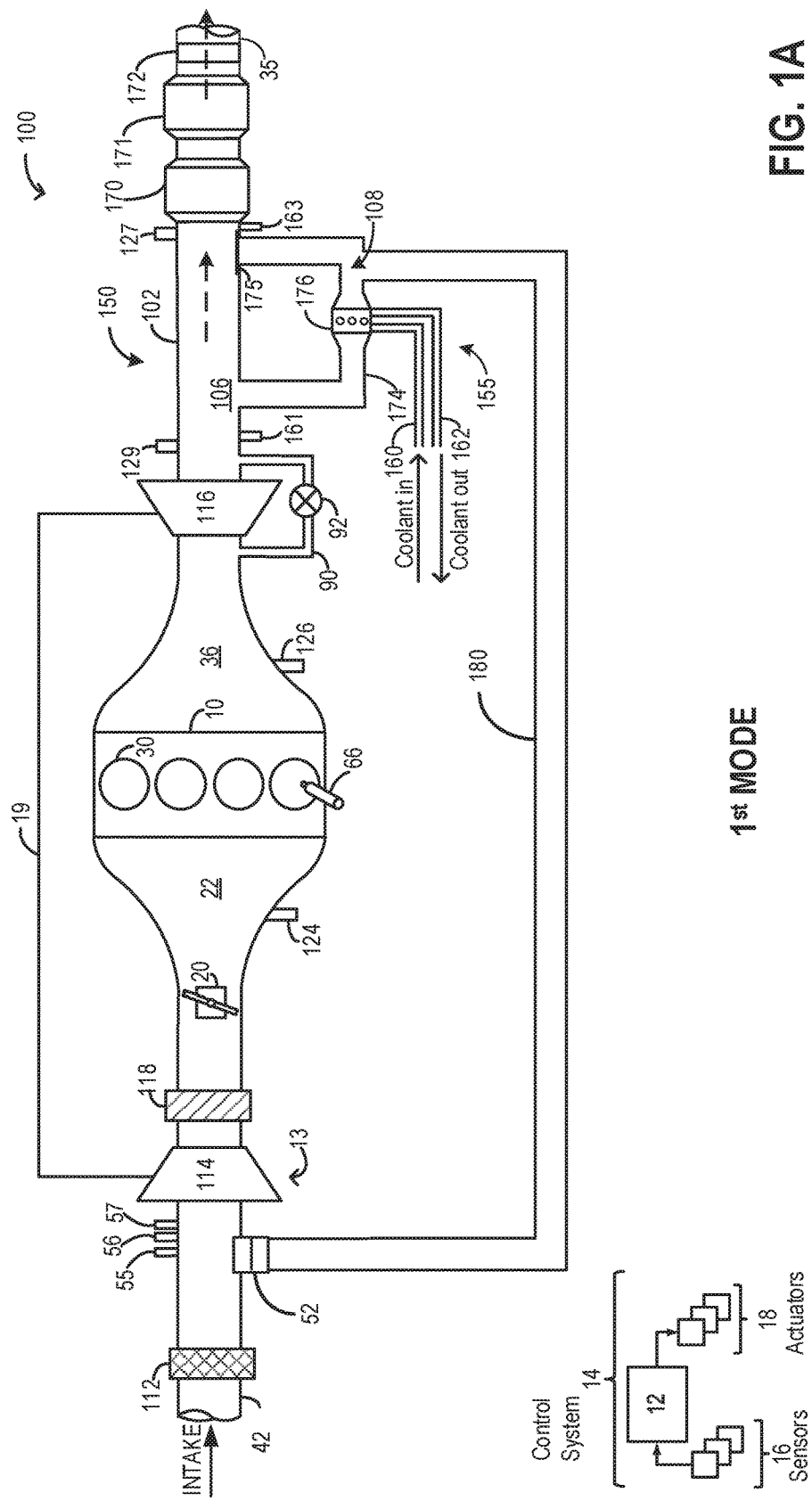
FIG. 1A shows an example first embodiment of an engine system including a heat exchange system with a pre-catalyst heat exchanger, operating in a first mode.
Figure 2A:
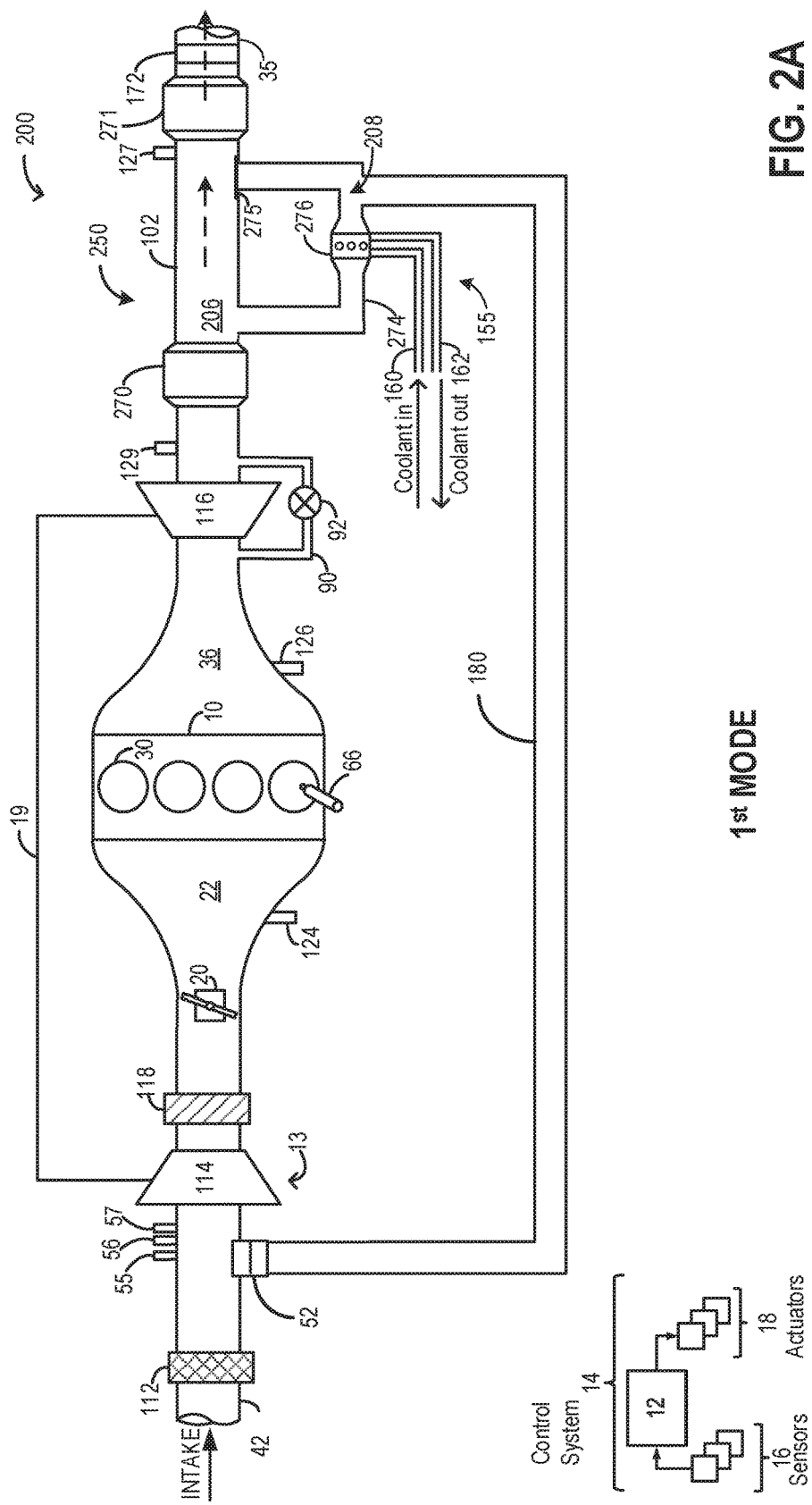
FIG. 2A shows an example second embodiment of an engine system including a heat exchange system with a mid-catalyst heat exchanger, operating in a first mode.
Figure 2B:
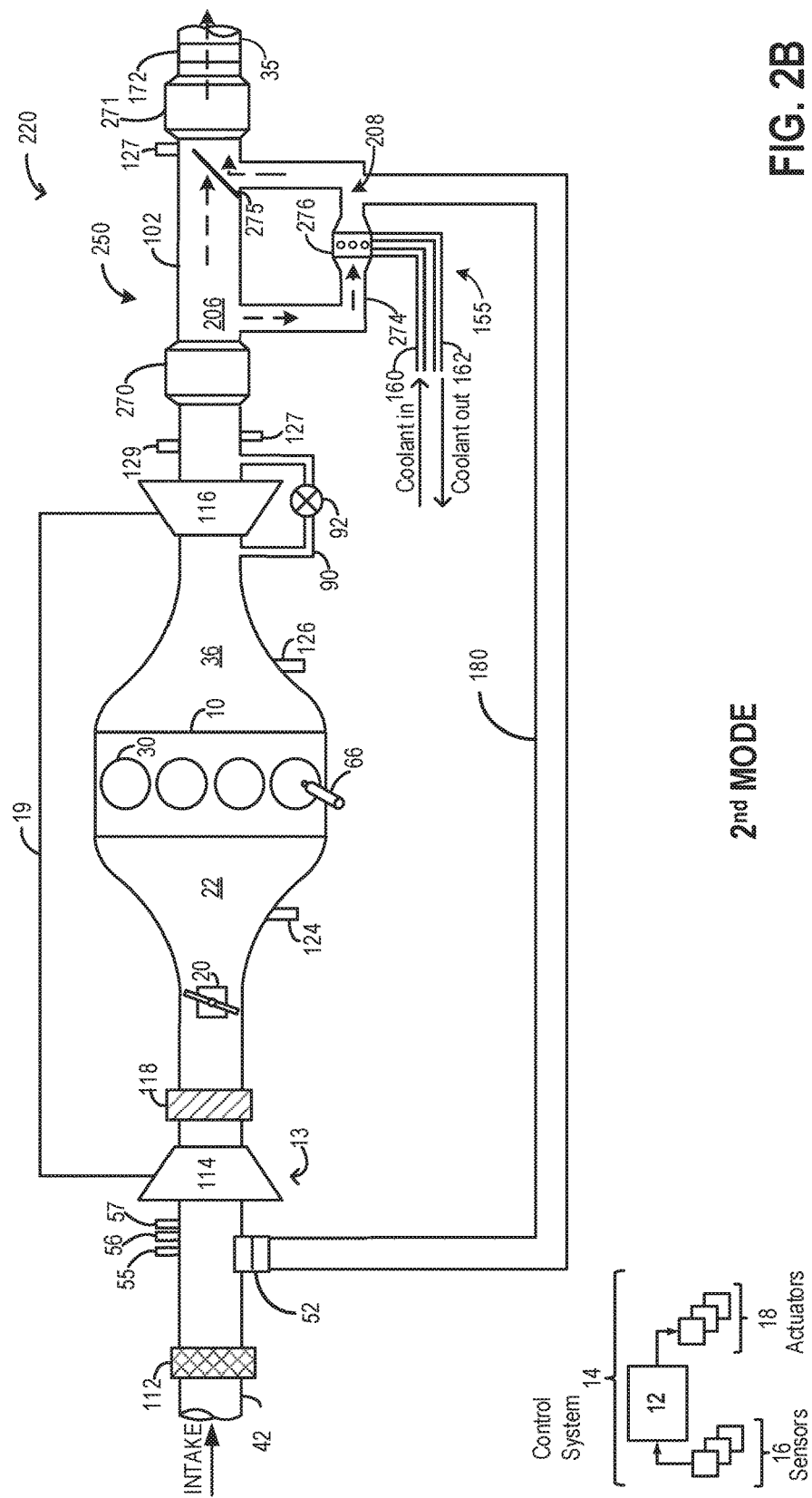
FIG. 2B shows an example second embodiment of an engine system including a heat exchange system with a mid-catalyst heat exchanger, operating in a second mode.
Figure 3:
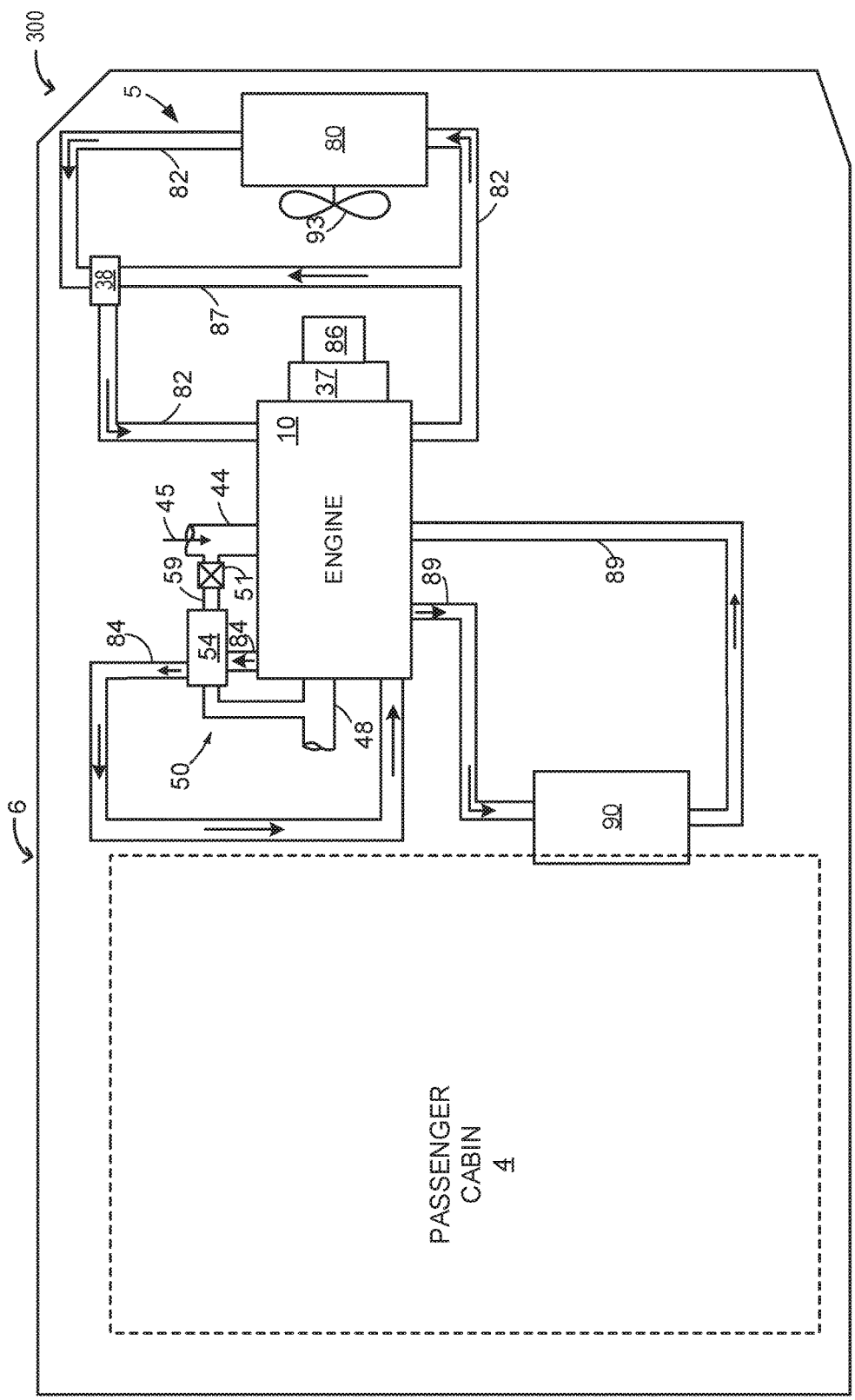
FIG. 3 shows an example coolant system coupled to the heat exchanger in FIGS. 1A-1C and FIGS. 2A-2C.
Figure 7:
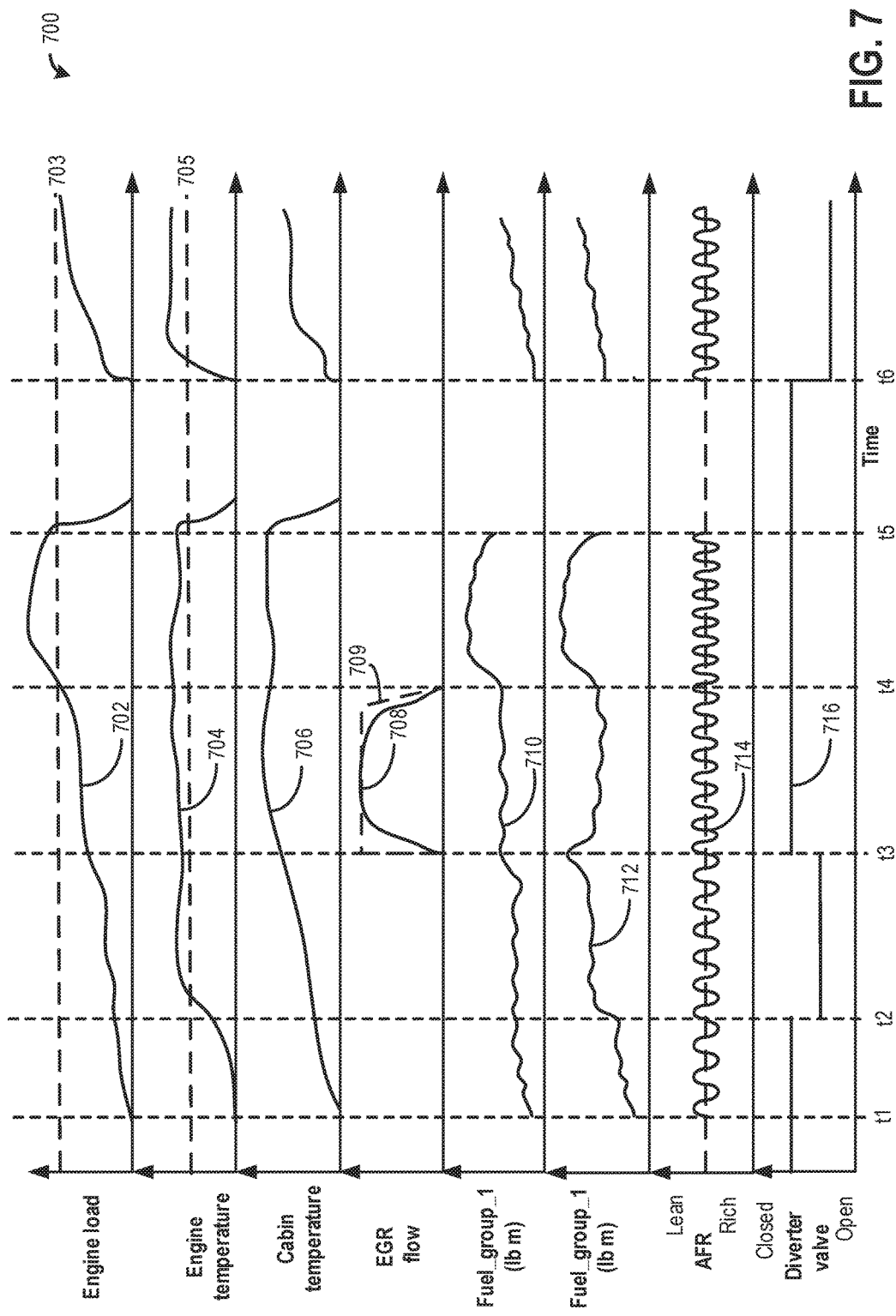
FIG. 7 shows an example operation of the heat exchange system of FIGS. 1A-1C and FIGS. 2A-2C.

The following description relates to systems and methods for a single pre-catalyst or mid-catalyst heat exchanger for improved exhaust gas heat recovery and exhaust gas recirculation (EGR) cooling. Different modes of operation of a first example engine system comprising a heat exchange system with a pre-catalyst heat exchanger are shown in FIGS. 1A-1C. Different modes of operation of a second example engine system comprising a heat exchange system with a mid-catalyst heat exchanger are shown in FIGS. 2A-2C. An example coolant system coupled to the heat exchanger of FIGS. 1A-1C and FIGS. 2A-2C is shown in FIG. 3. An engine controller may be configured to perform control routines, such as the example routines of FIGS. 4 and 5, to vary the positions of one or more valves of the exhaust system to adjust exhaust flow through the heat exchanger in the systems of FIGS. 1A-1C and FIGS. 2A-2C, respectively. The different modes of operation of the example engine systems of FIGS. 1A-1C and FIGS. 2A-2C are tabulated in FIG. 6. An example operation of the systems of FIGS. 1A-1C and FIGS. 2A-2C is shown in FIG. 7.

FIG. 1A schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1A, compressor 114 is coupled, through charge-air cooler (CAC) 118 to throttle valve 20. Throttle valve 20 is coupled to engine intake manifold 22. From the compressor, the compressed air charge flows through the charge-air cooler 118 and the throttle valve to the intake manifold. In the embodiment shown in FIG. 1A, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, compressed air, and recirculated exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1A, exhaust from the one or more exhaust manifold sections is directed to turbine 116 to drive the turbine. The combined flow from the turbine and the wastegate then may flow through exhaust after-treatment devices 170 and 171. In one example, the first exhaust after-treatment devices 170 may be a light-off catalyst, and the second exhaust after-treatment devices 171 may be an underbody catalyst. In general, the exhaust after-treatment devices 170 and 171 are configured to catalytically treat the exhaust flow, and thereby reduce an amount of one or more substances in the exhaust flow. For example, the exhaust after-treatment devices 170 and 171 may be configured to trap $NO_x$ from the exhaust flow when the exhaust flow is lean and to reduce the trapped $NO_x$ when the exhaust flow is rich. In other examples, the exhaust after-treatment devices 170 and 171 may be configured to disproportionate $NO_x$ or to selectively reduce $NO_x$ with the aid of a reducing agent. In still other examples, the exhaust after-treatment devices 170 and 171 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. All or part of the treated exhaust from the exhaust after-treatment devices 170 and 171 may be released into the atmosphere via main exhaust passage 102 after passing through a muffler 172.

An exhaust heat exchange system 150 may be coupled to the main exhaust passage upstream of the exhaust after-treatment devices 170 and 171. A bypass passage 174 of the heat exchange system 150 may be coupled to the main exhaust passage 102 downstream of the turbine 116, at the junction 106. The bypass passage 174 may extend from downstream of the turbine 116 to upstream of the first exhaust after-treatment device 170. The bypass passage 174 may be arranged parallel to the main exhaust passage 102. A heat exchanger 176 may be coupled to bypass passage 174 to cool the exhaust passing through the bypass passage 174. In one example, the heat exchanger 176 is a water-gas exchanger. An engine coolant system 155 may be coupled to the exhaust heat exchanger 176 for exhaust heat recovery and EGR cooling. Engine coolant may enter the heat exchanger 176 via a coolant inlet line 160 and after circulating through the heat exchanger 176, the coolant may return to the engine or may be routed to the heater core via a coolant outlet line 162. Exhaust gas recirculation (EGR) delivery passage 180 may be coupled to the exhaust bypass passage 174 at junction 108 downstream of heat exchanger 176 to provide low pressure EGR (LP-EGR) to the engine intake manifold, upstream of compressor 114. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor. From downstream of the turbine 116, exhaust may flow towards the exhaust after-treatment devices 170 and 171 via one or more of the main exhaust passage 102 and the bypass passage 174.

A diverter valve 175 coupled to the junction of the main exhaust passage 102 and the bypass passage 174, downstream of the heat exchanger 176, may be used to regulate the flow of exhaust through the bypass passage 174. An EGR valve 52 may be coupled to the EGR passage 180 at the junction of the EGR passage 180, and the intake passage 42. EGR valve 52 may be opened to admit a controlled amount of exhaust to the compressor inlet for desirable combustion and emissions control performance. EGR valve 52 may be configured as a continuously variable valve or as an on/off valve. Depending on operating conditions such as engine temperature, a portion of the exhaust may be diverted through bypass passage 174 and thereon to tailpipe 35 via the exhaust after-treatment devices 170 and 171 or to the inlet of compressor 114 via the EGR passage 180 and the exhaust gas recirculation (EGR) valve 52. Opening of the diverter valve 175 and the EGR valve 52 may be regulated to control the flow of exhaust though the bypass passage 174 and the heat exchanger 176.

A plurality of sensors, including an exhaust temperature sensor 127 and an exhaust pressure sensor 129, may be coupled to the main exhaust passage. A first exhaust gas oxygen sensor 161 may be coupled to the main exhaust passage 102 upstream of the bypass passage 174 and a second exhaust gas oxygen sensor 163 may be coupled to the main exhaust passage 102 downstream of the bypass passage 174 (upstream of the first exhaust after-treatment device 170). The sensor 161 may provide an estimation of a first air-fuel-ratio of exhaust entering the heat exchanger 196 and the sensor 163 may provide an estimation of a second air-fuel-ratio of exhaust exiting the bypass passage 174 (after flowing through the heat exchanger 176). The oxygen sensors may be linear oxygen sensors or UEGO (universal or wide-range exhaust gas oxygen), two-state oxygen sensors or EGO, HEGO (heated EGO), a NOx, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas oxygen sensor 126 located upstream of the turbine 116, pedal position sensor, MAP sensor 124, exhaust temperature sensor 127, exhaust pressure sensor 129, oxygen sensors 161 and 163, compressor inlet temperature sensor 55, compressor inlet pressure sensor 56, and compressor inlet humidity sensor 57. Other sensors such as additional pressure, temperature, air-fuel-ratio, and composition sensors may be coupled to various locations in engine system 100. The actuators 81 may include, for example, throttle 20, EGR valve 52, diverter valve 175, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions and EGR requirements the controller 12 may regulate the position of the diverter valve 175, and the EGR valve 52 to route exhaust to directly flow to the exhaust after-treatment devices 170 and 171 or via the heat exchanger 176. Also, based on engine operating conditions, opening of EGR valve 52 may be adjusted to draw a desired amount of EGR from the exhaust bypass passage into the engine intake manifold via the heat exchanger 176. An example control routine for exhaust flow regulation is described with regard to FIG. 4.

FIG. 1A shows operation of the heat exchange system 150 in a first operating mode. As such, the first operating mode represents a first setting of the diverter valve 175 and the EGR valve 52 that enables exhaust flow control. In the first operating mode, the diverter valve 175 may be in a first (fully closed) position, and the EGR valve 52 may be in a closed position. When in the first operating mode, due to the first position of the diverter valve 175, exhaust exiting the turbine 116 and wastegate 90 may not enter the bypass passage 174 but may flow downstream via the main exhaust passage 102 to the exhaust after-treatment devices. After flowing through the first and second exhaust after-treatment devices 170 and 171, and the muffler 172 the exhaust may be released to the atmosphere via the tailpipe 35.

The heat exchange system may be operated in the first operating mode (as described above) during cold-start conditions. During such conditions, the exhaust after-treatment devices 170 and 171 may not be optimally functional as the temperature of the devices may not have reached their respective light-off temperatures. Therefore, the heat exchange system may be operated in the first operating mode responsive to at least the exhaust after-treatment device 170 (upstream exhaust catalyst) being below its activation temperature. Also, EGR may not be requested during cold-start conditions. By adjusting exhaust flow to route hot exhaust directly through the exhaust after-treatment devices 170 and 171 (bypassing the heat exchanger), exhaust heat may be transferred to the catalysts, expediting their activation. Therefore, hot exhaust may be effectively used for increasing the temperature of the exhaust after-treatment devices (catalysts) 170 and 171. By expediting attainment of catalyst light-off by using exhaust heat, the need for spark retard may be reduced, thereby increasing fuel efficiency of the engine. By attaining the light-off temperature of the exhaust after-treatment devices 170 and 171 faster, emissions quality may be improved.

In one example, engine system 100 may be coupled in hybrid powertrain. By adjusting exhaust flow through the heat exchange system, rapid engine coolant warm-up may be achieved during cold start operation of a Hybrid Powertrain. By bringing the coolant to operating temperature quickly, shut-down of the internal combustion engine 100 may be enabled sooner.

FIG. 1B shows a schematic view 120 of operation of the heat exchange system 150 in a second operating mode. Components previously introduced in FIG. 1A are numbered similarly and not reintroduced.

As such, the second operating mode represents a second setting of the diverter valve 175 and the EGR valve 52 that enables exhaust flow control. In the second operating mode, the diverter valve 175 may be in a second (partially open) position, and the EGR valve 52 may be in the closed position. When in the second operating mode, due to the second position of the diverter valve 175, a first portion of the exhaust (exiting the turbine and wastegate) may enter the bypass passage 174 at the junction 106, and flow through the heat exchanger 176. After passing through the heat exchanger 176, the first portion of the exhaust may return to the main exhaust passage 102 via the diverter valve 175. The exhaust may then flow through the first exhaust after-treatment device 170, the second exhaust after-treatment device 171, and the muffler 172 before being released to the atmosphere via the tailpipe 35. Concurrently, a second (remaining) portion of exhaust may be directly routed to the catalyst, without entering the bypass passage 174. The first and second portions of exhaust may combine at the main exhaust passage 102 before entering the first exhaust after-treatment device 170.

The heat exchange system may be operated in the second operating mode (as described above) responsive to the first exhaust after-treatment device 170 exhaust catalyst exceeding a first activation temperature and the second exhaust after-treatment device 171 exceeding a second activation temperature. Alternatively, the heat exchange system may be transitioned to be operated in the second mode after at least the first exhaust after-treatment device 170 has attained its light-off temperature. By flowing a part of the exhaust through the heat exchanger, heat from the exhaust may be recovered using an engine coolant. The heat extracted from the exhaust may be used for further engine warm-up, and for providing heat to a vehicle cabin, thereby reducing parasitic use of engine power (for operating auxiliary systems such as heaters) and improving fuel efficiency. The ratio of the first portion of exhaust (cooled at heat exchanger 176) to the second portion of exhaust (directly routed to first exhaust after-treatment device 170 without cooling) may be determined based on heating demands of the exhaust after-treatment devices 170 and 171. In order to maintain optimal performance of the exhaust after-treatment devices 170 and 171, heat from the second portion of the exhaust may be used to maintain the temperatures of the exhaust after-treatment devices 170 and 171 above their respective light-off temperatures. By regulating the first portion of exhaust flowing through the heat exchanger 176, heat recovered from the exhaust is adjusted and the temperature of the exhaust entering the first exhaust after-treatment device 170 is maintained for optimal catalyst performance. In one example, the first portion may be increased as the temperature of at least the first exhaust after-treatment device 170 increases above its (first) activation temperature. In another example, the second portion may be increased as the temperature of at least the first exhaust after-treatment device 170 decreases below the (first) activation temperature. Based on the estimated ratio, the degree of opening of the diverter valve 175 may be adjusted to enable the first portion of exhaust to flow through the bypass passage 174.

In order to maintain optimal performance of the exhaust after-treatment device 170, perturbation in the air-fuel-ratio (air-fuel-ratio phase shift) of the exhaust reaching the device is desired. Since a part of the exhaust (first portion) entering the exhaust after-treatment device 170 flows through a longer route, there may be unintended changes to the air-fuel ratio of the exhaust mixture reaching the exhaust after-treatment device 170. In order to achieve phased perturbation, the fuel delivered to each bank of the engine (with at least two banks) may be adjusted to allow the two banks to have a relative air-fuel-ratio perturbation phase-shift from one another. Exhaust from the two banks may be combined to achieve a near-stoichiometric mixture prior to entering the exhaust after-treatment devices 170 and 171. Since both rich and lean exhaust species may be present simultaneously, a highly reactive mixture would continuously enter the after-treatment devices 170 and 171, thereby improving the reactive functionality of the devices 170 and 171.

The first portion of the exhaust entering the exhaust after-treatment devices 170 and 171 flows through a longer route via the heat exchanger 176 compared to the second portion of the exhaust that flows directly to the devices 170 and 171. As a result, the air-fuel ratio of the mixture of the first portion and the second portion may differ from a desired air-fuel ratio at a location immediately upstream of the first catalyst. As an example, a rich air-fuel ratio perturbation may be requested at the catalyst followed immediately by a lean air-fuel ratio perturbation. Accordingly, the cylinders may be operated rich and then immediately after, operated lean. However, due to the lag incurred by the first portion relative to the second portion, by the time the rich first portion of exhaust reaches the first catalyst, the rich second portion of exhaust may have already traversed the first catalyst. Further, the lean second portion of exhaust may reach the first catalyst at the same time as the rich first portion of exhaust resulting in an exhaust mixture that is leaner than was intended.

In order to maintain the requested air-fuel-ratio perturbation, cylinder combustion air-fuel-ratios may be adjusted on an individual cylinder basis such that the even after being routed through the two separate flow-paths, the air-fuel ratio of the exhaust mixture reaching the exhaust after-treatment devices 170 and 171 is at a target air-fuel-ratio. The cylinder-to-cylinder air-fuel ratio adjustments may be carried out based on a correlation between inputs from the first oxygen sensor 161 coupled to the main exhaust passage 102 upstream of the bypass passage 174 (indicative of a real time estimate of the air-fuel ratio of exhaust prior to entering the bypass passage) and the second oxygen sensor 163 coupled to the main exhaust passage 102 downstream of the bypass passage 174 (indicative of a real time estimate of the air-fuel ratio of the first portion of exhaust mixed with the second portion of exhaust). The cylinder-to-cylinder air-fuel ratio adjustments may include operating a first group of cylinders richer than stoichiometry while operating a second group of cylinders leaner than stoichiometry, wherein a degree of richness of the first group of cylinders and a degree of leanness of the second group of cylinders is based on the target amplitude and frequency of the air-fuel-ratio perturbation. In one example, the engine may be a V-engine with the first group of cylinders comprising a first bank and the second group of cylinders comprising a second bank. In another example, the engine may be an in-line engine with two cylinder groups. As such, the first group of cylinders may have a different number of cylinders compared to the second group of cylinders and the degree of richness or leanness may be adjusted based on the number of cylinders in each group. The exhaust manifold may be a split exhaust manifold with a first set of runners coupling the first group of cylinders to a first exhaust manifold while a second (different) set of runners couple the second group of cylinders to a second exhaust manifold. The firing order of the two groups of cylinders may be different with exhaust from one set of cylinders combining with exhaust from the second group of cylinders upstream of the bypass passage 174. The firing order of the two cylinder groups may be adjusted to enable exhaust from the first group of cylinders (via the first exhaust manifold) to be routed via the bypass passage 174 and exhaust from the second group of cylinders (via the second exhaust manifold) to be routed directly to the exhaust after-treatment device 170. A target air-fuel-ratio perturbation may be maintained by adjusting the timing of exhaust pulses from the first group relative to the second group. Also, the desired air-fuel ratio perturbation may be maintained by adjusting the amount of fuel injected to specific cylinders in the different cylinder groups.

FIG. 1C shows a schematic view 140 of operation of the heat exchange system 150 in a third operating mode. Components previously introduced in FIG. 1A are numbered similarly and not reintroduced.

As such, the third operating mode represents a third setting of the diverter valve 175, and the EGR valve 52 that enables exhaust flow control. In the third operating mode, the diverter valve 175 may be in the first position, and the EGR valve 52 may be in an open position. When in the third operating mode, due to the opening of the EGR valve 52, a first portion of exhaust exiting the turbine 116 and wastegate 90 may enter the bypass passage at junction 106 but may not return to the main exhaust passage via the diverter valve 175. A second (remaining) portion of exhaust may not enter the bypass passage but may flow directly to the tailpipe via the exhaust after-treatment devices 170 and 171 and muffler 172. The first portion of the exhaust, after being cooled at the heat exchanger 176, may enter the EGR delivery passage 180 at junction 108. The EGR may be delivered to the engine intake manifold via the EGR delivery passage 180, and the EGR valve 52. In this mode, the heat exchanger 176 operates as an EGR cooler.

The engine system may be operated in the third operating mode (as described above) after activation of exhaust after-treatment devices 170 and 171, and after engine and vehicle cabin warm-up (when exhaust heat may no longer be desired for vehicle component heating purposes), and EGR is requested for engine operations. By providing cooler EGR, fuel efficiency, and emissions quality may be improved. The ratio of the first portion of exhaust (delivered as EGR) to the second portion of exhaust (directly routed to the tailpipe without cooling) may be determined based on the desired EGR level, which is further based on engine operating conditions such as engine load, engine speed, engine temperature etc. The controller may determine the desired EGR level through a determination that directly takes into account determined engine speed, engine load, engine temperature, etc., such as increasing the EGR level as the engine load increases in the low-mid load region, and then decreasing the EGR amount as the engine load increases in the mid-high load region. The controller may alternatively determine the desired EGR level by referring to a look-up table stored in the controller's memory, input to the look-up table being engine speed and engine load, and the output being an EGR amount or ratio of the first portion of exhaust to the second portion of exhaust. Based on the determined ratio, the opening of the EGR valve 52 may be regulated to allow the desired amount of exhaust to enter the bypass passage 174, and the EGR delivery passage 180.

In one example, the engine system may be operated in the third operating mode even when there is a demand for exhaust heat recovery. As the EGR is cooled at the heat exchanger, the heat from the exhaust may be transferred to the coolant circulating through the heat exchanger, and the recovered heat may be used for providing heat to vehicle components such as vehicle cabin, cylinder head, etc.

An alternate embodiment of FIG. 1A is shown in FIG. 2A and elaborated below with reference to example engine system 200. All components of the engine system 200 may be identical to that of engine system 100 other than the heat exchange system 250. Components previously introduced in FIG. 1A are numbered similarly and not reintroduced. Similar to the embodiment of FIG. 1A, engine system 200 of FIG. 2A may further include control system 14 for controlling engine operations. The different modes of operation of the heat exchange system 250 are elaborated with reference to FIGS. 2A-2C.

As seen in FIG. 2A, engine system 200 includes a heat exchange system 250 with a first exhaust after-treatment device 270 coupled to a main exhaust passage 102 and a second exhaust after-treatment device 271 coupled to the main exhaust passage 102, downstream of the first exhaust after-treatment device 270. A bypass passage 274 may be coupled to the main exhaust passage 102 downstream of the first exhaust after-treatment device 270, at the junction 206. The bypass passage 274 may extend from first exhaust after-treatment device 270 to upstream of the second exhaust after-treatment device 271. The bypass passage 274 may be arranged parallel to the main exhaust passage 102. A heat exchanger 276 may be coupled to bypass passage 274 to cool the exhaust passing through the bypass passage 274. In one example, the heat exchanger 276 is a water-gas exchanger. An engine coolant system 155 may be coupled to the exhaust heat exchanger 276 for exhaust heat recovery and EGR cooling. Engine coolant may enter the heat exchanger 276 via a coolant inlet line 160 and after circulating through the heat exchanger 276, the coolant may return to the engine or may be routed to the heater core via a coolant outlet line 162. Exhaust gas recirculation (EGR) delivery passage 180 may be coupled to the exhaust bypass passage 274 at junction 208 downstream of heat exchanger 276 to provide low pressure EGR (LP-EGR) to the engine intake manifold, upstream of compressor 114. In further embodiments, the engine system may include a high pressure EGR flow path wherein exhaust gas is drawn from upstream of turbine 116 and recirculated to the engine intake manifold, downstream of compressor 114. In yet a further embodiment the engine may be naturally aspirated, without a turbocharger, and the EGR may be drawn taken from the exhaust passage (in the position shown) and supplied to the intake manifold. One or more sensors may be coupled to EGR passage 180 for providing details regarding the composition and condition of the EGR. Alternatively, EGR conditions may be inferred by the one or more temperature, pressure, humidity, and air-fuel ratio sensors 55-57 coupled to the compressor inlet. From downstream of the first exhaust after-treatment device 270, exhaust may flow towards the second exhaust after-treatment device 271 via one or more of the main exhaust passage 102 and the bypass passage 274.

A diverter valve 275 coupled to the junction of the main exhaust passage 102 and the bypass passage 274, downstream of the heat exchanger 276, may be used to regulate the flow of exhaust through the bypass passage 274. An EGR valve 52 may be coupled to the EGR passage 180 at the junction of the EGR passage 180, and the intake passage 42. EGR valve 52 may be opened to admit a controlled amount of exhaust to the compressor inlet for desirable combustion and emissions control performance. Depending on operating conditions such as engine temperature, a portion of the exhaust may be diverted through bypass passage 274 and thereon to tailpipe 35 via the second exhaust after-treatment device 271 or to the inlet of compressor 114 via the EGR passage 180 and the exhaust gas recirculation (EGR) valve 52. Opening of the diverter valve 275 and the EGR valve 52 may be regulated to control the flow of exhaust though the bypass passage 274 and the heat exchanger 276.

In this way, the systems of FIGS. 1A-1C provide for an engine system comprising: an engine intake manifold, an engine exhaust system with an exhaust passage and a heat exchange system, the exhaust passage including an exhaust humidity sensor, an exhaust temperature sensor, an exhaust pressure sensor, one or more exhaust catalysts, and a muffler, the bypass passage coupled to the exhaust passage from upstream of the one or more catalysts to upstream of the muffler, the heat exchange system including a bypass passage housing a heat exchanger, a coolant system fluidly coupled to the heat exchanger, an engine block, and a heater core, the coolant system including an engine coolant temperature sensor, a diverter valve coupling an outlet of the bypass passage to the exhaust passage, an exhaust gas recirculation (EGR) passage with an EGR valve for recirculating exhaust from the bypass passage, downstream of the heat exchanger, to the intake manifold, a first oxygen sensor coupled to the exhaust passage upstream of the heat exchanger and a second oxygen sensor coupled to the exhaust passage downstream of the heat exchanger. The engine system further includes a controller with computer readable instructions stored on non-transitory memory for: estimating engine temperature via the engine coolant temperature sensor and catalyst temperature via the exhaust temperature sensor, and in response to a lower than threshold catalyst temperature, closing each of the EGR valve and the diverter valve to flow exhaust directly to the one or more catalysts, and in response to a higher than threshold catalyst temperature and a lower than threshold engine temperature, opening the diverter valve to flow a first amount of exhaust from the exhaust manifold to the one or more catalysts via the heat exchanger while flowing a second, remaining amount directly to the one or more catalysts, bypassing the heat exchanger.

FIG. 2A shows operation of the heat exchange system 250 in a first operating mode. The first operating mode represents a first setting of the diverter valve 275 and the EGR valve 52 that enables exhaust flow control. In the first operating mode, the diverter valve 275 may be in a first (fully closed) position, and the EGR valve 52 may be in a closed position. When in the first operating mode, due to the first position of the diverter valve 275, exhaust exiting the first exhaust after-treatment device 270 may not enter the bypass passage 274 but may flow downstream via the main exhaust passage 102 to the second exhaust after-treatment device 271. After flowing through the second exhaust after-treatment device 271 and the muffler 172, the exhaust may be released to the atmosphere via the tailpipe 35.

The heat exchange system 250 may be operated in the first operating mode (as described above) during cold-start conditions. During such conditions, the exhaust after-treatment devices 270 and 271 may not be optimally functional as the temperature of the devices may not have reached their respective light-off (activation) temperatures. Also, EGR may not be requested during cold-start conditions. By adjusting exhaust flow to route hot exhaust directly through both the exhaust after-treatment devices 270 and 271 during the cold-start, exhaust heat may be transferred to the after-treatment devices 270 and 271, expediting their activation. Therefore, hot exhaust may be effectively used for increasing the temperature of the exhaust after-treatment devices (catalysts) 270 and 271. By expediting attainment of catalyst light-off by using exhaust heat, the need for spark retard may be reduced, thereby increasing fuel efficiency of the engine. By attaining the light-off temperature of the exhaust after-treatment devices 270 and 271 faster, emissions quality may be improved.

The heat exchange system 250 may also be operated in the first operating mode during each of a higher than threshold engine temperature and a higher than threshold engine load conditions. During such higher than threshold engine load conditions, there may be a higher volume of exhaust to be treated by both the exhaust after-treatment devices 270 and 271. For optimal performance of the exhaust after-treatment devices 270 and 271, a target air-fuel-ratio perturbation may be maintained at the exhaust after-treatment devices 270 and 271. In order to maintain the target air-fuel-ratio perturbation of exhaust reaching each of the exhaust after-treatment devices 270 and 271, exhaust may be directly routed from the first exhaust after-treatment device 270 to the second exhaust after-treatment device 271. Instead of routing exhaust directly, if a first portion of the exhaust is routed from the first exhaust after-treatment device 270 to the second exhaust after-treatment device 271 via the bypass passage, while routing a second, remaining portion directly from the first exhaust after-treatment device 270 to the second exhaust after-treatment device 271, the two portions of the exhaust entering the second exhaust after-treatment device 271 may flow through two different routes. The difference in routes between the two portions may result in undesired changes in the target air-fuel-ratio perturbation of exhaust reaching the second exhaust after-treatment device 271 which may adversely affect the operation of the second exhaust after-treatment device 271 during higher volume exhaust flow, such as during higher load conditions. Therefore, during such higher than threshold load conditions, the heat exchange system may be operated in the first operating mode such that each of the exhaust after-treatment devices 270 and 271 may be optimally functional.

FIG. 2B shows a schematic view 220 of operation of the heat exchange system 250 in a second operating mode. Components previously introduced in FIG. 2A are numbered similarly and not reintroduced.

The second operating mode represents a second setting of the diverter valve 275 and the EGR valve 52 that enables exhaust flow control. In the second operating mode, the diverter valve 275 may be in a second (partially open) position, and the EGR valve 52 may be in the closed position. When in the second operating mode, due to the second position of the diverter valve 275, a first portion of the exhaust (exiting the first exhaust after-treatment devices 270) may enter the bypass passage 274 at the junction 206, and flow through the heat exchanger 276. After passing through the heat exchanger 276, the first portion of the exhaust may return to the main exhaust passage 102 via the diverter valve 275. The exhaust may then flow through the second exhaust after-treatment device 271 and the muffler 172 before being released to the atmosphere via the tailpipe 35. Concurrently, a second (remaining) portion of exhaust may be directly routed directly from the first exhaust after-treatment device 270 to the second exhaust after-treatment device 271, without entering the bypass passage 274. The first and second portions of exhaust may combine at the main exhaust passage 102 before entering the second exhaust after-treatment device 270.

The heat exchange system 250 may be operated in the second operating mode (as described above) after the second exhaust after-treatment device 271 has attained its light-off temperature and is activated. Exhaust system operation may be transitioned from the first mode to the second mode responsive to activation of the second exhaust after-treatment device 271, even when the first exhaust after-treatment device 270 has not attained its light-off temperature, as during the second mode, the exhaust continues to flow through the first exhaust after-treatment device 270 before entering the bypass passage 274. By flowing a part of the exhaust through the heat exchanger 276, heat from the exhaust may be recovered using an engine coolant. The heat extracted from the exhaust may be used for further engine warm-up, and for providing heat to a vehicle cabin, thereby reducing parasitic use of engine power (for operating auxiliary systems such as heaters) and improving fuel efficiency. The ratio of the first portion of exhaust (cooled at heat exchanger 276) to the second portion of exhaust (directly routed to second exhaust after-treatment device 271 without cooling) may be determined based on the temperature of the second exhaust after-treatment device 271. In order to maintain optimal performance of the exhaust after-treatment devices 270 and 271, the temperature of the devices may be maintained above their respective light-off (activation) temperatures. Heat from the second portion of the exhaust may be used to maintain the temperature of the second exhaust after-treatment device 271 above its light-off temperature. In one example, the first portion may be increased as the temperature of the second exhaust after-treatment device 271 increases above a threshold temperature, wherein the threshold temperature may correspond to the light-off temperature of the second exhaust after-treatment device 271. In another example, the second portion may be increased as the temperature of the second exhaust after-treatment devices 272 decreases below the light-off temperature. Based on the estimated ratio, the degree of opening of the diverter valve 275 may be adjusted to enable the first portion of exhaust to flow through the bypass passage 274 while the remaining second portion of exhaust flows directly through the main exhaust passage 102 to the second exhaust after-treatment device 271.

The heat exchange system 250 may alternatively be operated in the second mode during conditions when the engine load is lower than a threshold engine load, and the entire amount of exhaust may be effectively treated by the first exhaust after-treatment device 270. During operation in this mode, since exhaust reaches the second exhaust after-treatment device 271 via two different flow-paths, there may be a difference between the target air-fuel-ratio and the actual air-fuel-ratio reaching the second exhaust after-treatment device 271 which may affect its performance. However, since the exhaust is substantially treated by the first exhaust after-treatment device 270 before it reaches the second exhaust after-treatment device 271, the difference in air-fuel-ratio perturbation may not significantly affect the performance efficiency of the second exhaust after-treatment device, or the overall exhaust emissions quality.

FIG. 2C shows a schematic view 240 of operation of the heat exchange system 250 in a third operating mode. Components previously introduced in FIG. 2A are numbered similarly and not reintroduced.

The third operating mode represents a third setting of the diverter valve 275 and the EGR valve 52 that enables exhaust flow control. In the third operating mode, the diverter valve 275 may be in the first (fully closed) position, and the EGR valve 52 may be in an open position. When in the third operating mode, due to the opening of the EGR valve 52, a first portion of exhaust exiting the first exhaust after-treatment device 270 may enter the bypass passage at junction 206 but may not return to the main exhaust passage via the diverter valve 275. A second (remaining) portion of exhaust may not enter the bypass passage but may flow directly to the second exhaust after-treatment device 271. The first portion of the exhaust, after being cooled at the heat exchanger 276, may enter the EGR delivery passage 180 at junction 108. The cooled EGR may be delivered to the engine intake manifold via the EGR delivery passage 180, and the EGR valve 52. In this mode, the heat exchanger 276 operates as an EGR cooler.

The engine system may be operated in the third operating mode (as described above) when EGR is requested to attain a desired engine dilution. Also, during this EGR request, exhaust after-treatment device 270 may have attained its light-off temperature, and engine and vehicle cabin warm-up may no longer be desired. By providing EGR, fuel efficiency, and emissions quality may be improved. The ratio of the first portion of exhaust (delivered as EGR) to the second portion of exhaust (directly routed to tailpipe without cooling) may be determined based on the desired EGR amount which is further based on engine operating conditions such as engine load, engine speed, engine temperature etc. In one example, the controller may determine the EGR amount through a determination that directly takes into account parameters such as engine load, engine speed, engine temperature, etc. In another example, the controller may determine the EGR level based on a calculation using a look-up table with the input being one or more of engine load, engine speed, engine temperature, etc. and the output being the EGR amount. Based on the determined ratio, the opening of the EGR valve 52 may be regulated to allow the desired amount of exhaust to enter the bypass passage 274 and then the EGR delivery passage 180. In one example, the opening of the EGR valve may be increased as the first portion (amount of EGR requested) increases and the second portion correspondingly decreases.

In one example, the engine system may be operated in the third operating mode when there is a demand for exhaust heat recovery in addition to the EGR demand. As the EGR is cooled at the heat exchanger, the heat from the exhaust may be transferred to a coolant circulating through the heat exchanger, and the recovered heat may be used for providing heat to vehicle components such as vehicle cabin, engine block, cylinder head, etc. Also, during demand for both EGR and exhaust heat recovery diverter valve 275 may be opened to flow the entire volume of exhaust via the heat exchanger 276. After flowing through the heat exchanger 275, a first portion of exhaust may enter the EGR delivery passage while a second (remaining) portion of exhaust may return to the main exhaust passage 102 and may be released to the atmosphere via the tailpipe 35. The ratio of the first portion to the second portion may be adjusted based on EGR demand. The first portion may be increased and the second portion may be correspondingly decreased as EGR demand increases while the first portion may be decreased and the second portion may be correspondingly increased as EGR demand decreases. Opening of the EGR valve 52 may be adjusted based on the first position, the opening of the valve 52 increased with an increase in the first position and the opening of the valve 52 decreased with a decrease in the first position.

The three example modes of operation of the heat exchange systems of FIGS. 1A-1C and 2A-2C as discussed above are tabulated in FIG. 6. Line 602 of table 600 shows settings corresponding to the operation of both embodiments (pre-catalyst heat exchange system and mid-catalyst heat exchange system) of the heat exchange system operating in the first mode as described in FIGS. 1A and 2A, line 604 shows settings corresponding to the operation of both embodiments of the heat exchange system operating in the second mode as described in FIGS. 1B and 2B, and line 606 shows settings corresponding to the operation of both embodiments of the heat exchange system operating in the third mode as described in FIGS. 1C and 2C.

FIG. 3 shows an example embodiment 300 of a coolant system 5 in a motor vehicle 6. Coolant system 5 circulates engine coolant through internal combustion engine 10 and distributes recovered heat from an exhaust heat exchanger 54 to an internal combustion engine 10 via coolant line 84. In one example, the coolant system 5 may be the coolant system 155 and the exhaust heat exchanger 54 may be the heat exchanger 176 in FIGS. 1A-1C and the heat exchanger 276 in FIGS. 2A-2C.

Coolant system 5 circulates engine coolant from the combustion engine 10 to heater core 90, via coolant line 89 and also to radiator 80 and/or radiator bypass line 87 via coolant line 82. Coolant flow exiting radiator 80 radiator via coolant line 82 and coolant flow bypassing the radiator via coolant line 87 may converge at a thermostat valve 38 which controls the flow split between radiator 80 and radiator bypass line 87. In one example, the coolant system 5 may be the coolant system 155 and the exhaust heat exchanger 54 may be the heat exchanger 176 in FIGS. 1A-1C.

In particular, FIG. 3 shows coolant system 5 coupled to engine 10 and circulating engine coolant from engine 10, through exhaust heat exchanger 54, and to radiator 80 and/or radiator bypass line 87 via engine-driven (or electrical) water pump 86, and back to engine 10. A first coolant line 84 may couple the engine to the heat exchanger 54. Coolant from the heat exchanger 54 may be circulated to engine 10 via the first coolant loop 84. Water pump 86 may be coupled to the engine via front end accessory drive (FEAD) 37, and rotated proportionally to engine speed via belt, chain, etc.

Specifically, water pump 86 circulates coolant through passages in the engine block, head, etc., to absorb engine heat, which is then transferred via the radiator 80 to ambient air as regulated by thermostat valve 38. In an example where pump 86 is a centrifugal pump, the pressure (and resulting flow) produced may be proportional to the crankshaft speed, which may be directly proportional to engine speed. The temperature of the coolant may be regulated by a thermostat valve 38, which may be kept closed until the coolant reaches a threshold temperature, thereby reducing the transfer of heat from radiator 80 to ambient air when closed.

After flowing through the engine 10, coolant may exit the engine via a coolant line 89 and the heated engine coolant may then flow to heater core 90. After circulating through the heater core 90, the coolant returns to the engine via coolant line 89. Coolant exiting the engine via coolant line 82 may flow through the radiator 80 or through radiator bypass line 87 as regulated via the thermostat valve 38 with flow being directed through radiator bypass line 87 during conditions when the engine temperature (coolant temperature) is below a threshold temperature.

A fan 93 may be coupled to radiator 80 in order to increase airflow through radiator 80 as needed to maintain coolant temperatures below a desired threshold. In some examples, fan speed may be controlled by the engine controller directly. Alternatively, fan 93 may be coupled to the engine and driven directly from it.

The exhaust heat exchanger 54 may be used to extract heat from exhaust during cold-start conditions and when engine and/or cabin heating may be desired. In one example, an engine coolant may be circulated through the heat exchanger 54, heat from exhaust may be transferred to the engine coolant, and then the heated coolant (heated with the extracted exhaust heat) may be routed through the engine 10 via the first coolant loop 84. Coolant may then be circulated through the heater core 90 via the coolant line 89. Heat from the engine coolant may be transferred to the engine 10 and/or the heater core 90, and the engine 10 (including cylinder walls and pistons) and passenger cabin 4 may be heated using the heat drawn from the engine coolant. After flowing through the heater core, the coolant returns to the engine 10 via coolant line 89. Coolant exiting the engine via coolant line 82 may flow through the radiator 80 and/or radiator bypass line 87. After flowing through the radiator 80, the coolant returns to the engine 10 via the thermostat valve 38 while coolant bypassing the radiator via radiator bypass line 87 also returns to the engine 10 via thermostat valve 38.

Exhaust gas recirculation (EGR) system 50 may route a desired portion of exhaust gas from exhaust manifold 48 to intake manifold 44 via the exhaust heat exchanger 54 and EGR passage 59. During EGR delivery, the exhaust heat exchanger 54 may be used as an EGR cooler, and the EGR delivered to the intake manifold may be cooled at the exhaust heat exchanger 54. After cooling the EGR, the coolant may be routed to the engine 10, and then to the heater core 90, the radiator bypass line 87 and/or the radiator 80. During conditions when engine heating and/or passenger cabin heating is desired, the exhaust heat may be used to increase engine temperature and passenger cabin 4 temperature via heat transferred to the coolant via heat exchanger 54 as described before. The amount of EGR provided to intake manifold 44 may be varied by controller 12 via EGR valve 51. Further, an EGR sensor (not shown) may be arranged within EGR passage 59 and may provide an indication of one or more of pressure, temperature, and concentration of the exhaust gas.

Figure 4:
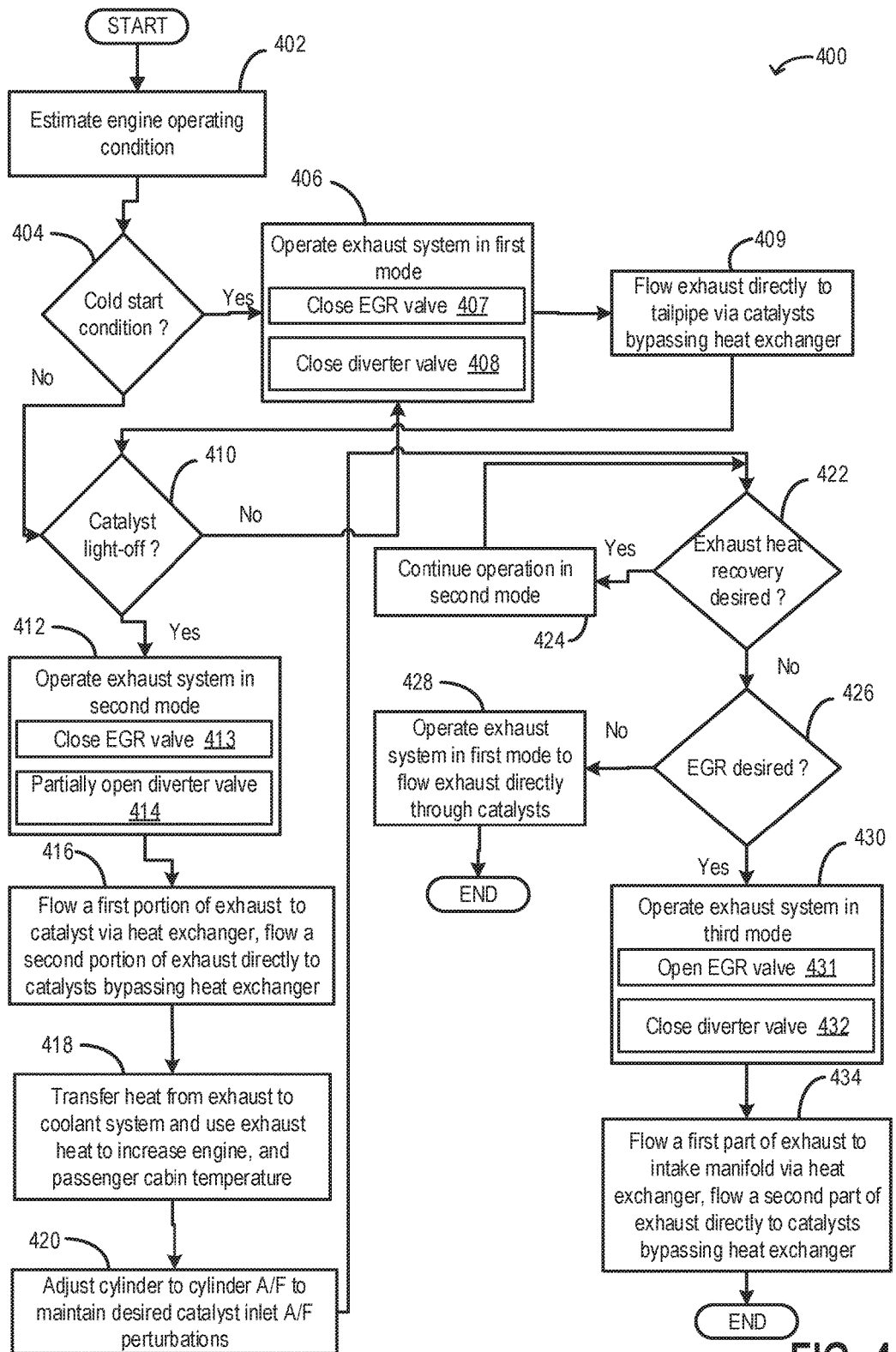
FIG. 4 shows a flow chart illustrating a first example method that may be implemented for adjusting exhaust flow through the heat exchange system of FIGS. 1A-1C.

FIG. 4 illustrates a first example method 400 that may be implemented for adjusting exhaust flow through the bypass assembly in the first embodiment of the exhaust heat exchange system as shown in FIGS. 1A-1C. Instructions for carrying out method 400 and the rest of the methods included herein may be executed by a controller based on instructions stored on a memory of the controller and in conjunction with signals received from sensors of the engine system, such as the sensors described above with reference to FIGS. 1A-1C. The controller may employ engine actuators of the engine system to adjust engine operation, according to the methods described below.

At 402, the routine includes estimating and/or measuring engine operating conditions. Conditions assessed may include, for example, engine temperature, engine load, driver torque demand, engine speed, throttle position, exhaust pressure, exhaust air-fuel-ratio, ambient conditions including ambient temperature, pressure, and humidity, MAP, MAF, boost, etc.

At 404, the routine includes determining if the vehicle engine is operating under cold-start conditions. An engine cold-start condition may be confirmed when the engine is started after a prolonged period of engine inactivity, when the engine temperature is lower than a threshold (such as below an exhaust catalyst light-off temperature), and while ambient temperatures are below a threshold. During cold-start conditions, expedited heating of exhaust catalysts may be desired for improved emissions quality while exhaust gas recirculation (EGR) may not be desired for optimal engine operations.

If engine cold-start conditions are confirmed, the routine moves to 406 in order to operate the exhaust bypass system in the first operating mode. Operating in the first mode, as described in relation to FIG. 1A, includes at 407, actuating the EGR valve (such as EGR valve 52 in FIG. 1A) to a closed position, and at 408, shifting a diverter valve (such as diverter valve 175 in FIG. 1A) coupled to a junction of the bypass passage (such as bypass passage 174 in FIG. 1A) and the main exhaust passage to a first, fully closed position.

Due to the fully closed position of the diverter valve, at 409, the entire volume of exhaust exiting the exhaust turbine and wastegate may not enter the bypass passage but may flow downstream through the main exhaust passage to the exhaust catalysts (such as after-treatment devices 170 and 171 in FIG. 1A). The heat from the exhaust may be used to heat the exhaust after-treatment devices, thereby expediting attainment of light-off (activation) temperature of each catalyst. By expediting attainment of catalyst light-off temperature by using exhaust heat, the need for spark retard may be reduced, thereby increasing fuel efficiency of the engine while improving emissions quality.

At 410, the routine includes determining if the exhaust system catalyst(s) have attained their respective light-off temperatures. Once the catalysts attain their light-off temperature, the catalysts may operate optimally providing improved emissions quality. Also, if it is determined (at 404) that the engine is not operating under cold-start conditions, such as during a hot-start condition, the routine may directly proceed to step 410.

If it is confirmed that the exhaust catalysts have not yet attained their light-off temperature, the routine may move to step 406 wherein the heat exchanger is operated in the first mode and exhaust is directly routed to the catalysts until at least the upstream exhaust catalyst has attained its light-off temperature. Alternatively, the heat exchange system may continue to be operated in the first mode until each of the exhaust catalysts have attained their respective light-off temperatures.

If it is confirmed that at least the upstream catalyst has attained its light-off temperature, or that both the exhaust catalysts have attained their respective light-off temperatures, at 412, the exhaust system may be operated in the second mode. Operation in the second mode, as described in relation to FIG. 1B, includes, at 413, maintaining the EGR valve in the closed position, and at 414, actuating the diverter valve to a second (partially open) position. In the second position, a degree of opening of the diverter valve may be varied based on a temperature of at least the upstream catalyst relative to the light-off temperature of the upstream catalyst in order to adjust the amount of exhaust entering the bypass passage.

Due to the second position of the diverter valve, at 416, a first portion of exhaust exiting the turbine and wastegate may enter the bypass passage, flow through the heat exchanger, and then return to the main exhaust passage, upstream of both the exhaust catalysts. A second portion of the exhaust may not enter the bypass passage, and may directly flow to the exhaust catalysts. Heat from the second portion of the exhaust may be used for maintaining the operating temperature of at least the upstream catalyst at or above its light-off temperature. In one example, a ratio of the first portion (routed via the heat exchanger) to the second portion (routed bypassing the heat exchanger) may be based on a temperature of at least the upstream catalyst relative to the light-off temperature (activation temperature) of the upstream catalyst. The first portion may be decreased and the second portion may be correspondingly increased as the temperature of the upstream catalyst decreases to below the light-off temperature. Similarly, the first portion may be increased for increased exhaust heat recovery and the second portion may be correspondingly decreased as the temperature of the upstream catalyst increases above the light-off temperature. Opening of the diverter valve may be adjusted to provide the first portion, the opening increased as the first portion increases and the opening decreased as the first portion decreases. As an example, if the temperature of the upstream catalyst decreases significantly below its light-off temperature (such as below a threshold temperature), the diverter valve may be fully closed to flow the entire volume of exhaust through the upstream and downstream catalyst without any exhaust flow through the heat exchanger (no exhaust heat recovery). In another example, the ratio of the first portion to the second portion may be based on each of the temperature of the upstream exhaust catalyst relative to the light-off temperature of the upstream catalyst and the temperature of the downstream exhaust catalyst relative to the light-off temperature of the downstream catalyst. The first portion may be decreased and the second portion may be correspondingly increased if the temperature of one of the upstream catalyst and the downstream catalyst decreases to below their respective light-off temperatures.

At 418, heat from the first portion of the exhaust flowing through the heat exchanger may be transferred to a coolant circulating through the heat exchanger. The coolant warmed via heat transfer at the heat exchanger may be circulated to the engine and a heater core so that it can be utilized for heating other components of the vehicle such as a cylinder head, an engine block, and a vehicle cabin space. As an example, the vehicle cabin temperature may be lower than a requested temperature and cabin heating may be required. Thus, based on cabin heating demand, as requested by a vehicle operator (e.g., based on a cabin temperature setting), heat may be transferred from the heater core to the cabin. For example, air may be drawn into the cabin via the heater core, thereby enabling the cabin to be warmed. The warmed coolant may also be circulated to an engine block and cylinder head to raise engine temperatures. In this way, heat from each of the first portion and the second portion of the exhaust may be used for providing heat to vehicle components, as desired.

At 420, a cylinder-to-cylinder air-fuel ratio may be adjusted to maintain a desired air-fuel-ratio perturbation in the exhaust flow reaching the catalysts (inlet of upstream catalyst). In other words, air fuel ratio perturbations created by adjusting cylinder-to-cylinder air-fuel ratio may be used to provide a target air fuel ratio at the catalysts. The air-fuel ratio perturbation may facilitate optimal operation of at least the upstream catalyst. Air-fuel ratio perturbations (fluctuation between leanness and richness) in the exhaust entering the upstream catalyst are caused due to a phase shift between exhaust exiting two groups of cylinders. A desired air-fuel ratio perturbation may be achieved by adjusting fueling of a first group of cylinders relative to fueling of a second group of cylinders. Exhaust from the two groups of cylinders may be combined to achieve a near-stoichiometric mixture prior to entering the upstream catalyst. Due to the desired phased air-fuel-ratio perturbation, a reactive mixture with both rich and lean exhaust species may reach the catalysts simultaneously thereby improving the reactive ability of the catalysts. Fueling may be adjusted on a per-cylinder basis as a function of the first portion of exhaust (routed to catalysts via heat exchanger) relative to the second portion (routed to catalysts bypassing heat exchanger) to provide a target exhaust air-fuel-ratio at the upstream catalyst. The first portion of the exhaust entering the catalysts flows through a longer route via the heat exchanger compared to the second portion of the exhaust that flows directly to the catalysts, therefore there may be unintended changes to the desired air-fuel ratio perturbation of exhaust reaching the catalysts. In one example, adjusting fueling as a function of the first portion relative to the second portion includes adjusting the fueling based on a transport delay of the first portion of the exhaust through the bypass passage relative to the transport delay of the second portion of the exhaust through the main exhaust passage. Fueling on the per-cylinder basis may be adjusted based on input from each of a first oxygen sensor positioned upstream of the heat exchanger (upstream of bypass passage) in the main exhaust passage (indicative of an air-fuel ratio of exhaust prior to entering the bypass passage) and a second oxygen sensor positioned downstream of the heat exchanger (downstream of diverter valve and upstream of the exhaust catalysts) in the main exhaust passage (indicative of an air-fuel ratio of the first portion of exhaust mixed with the second portion of exhaust). In one example, where the engine includes a first group of cylinders delivering exhaust into a first runner and a second group of cylinders delivering exhaust into a second, distinct runner, the first portion of exhaust may include exhaust received at a first timing from a first group of cylinders and the second portion of exhaust may include exhaust received at a second timing from a second, different group of cylinders. Therein, when the target air-fuel ratio perturbation at the upstream catalyst includes a rich air-fuel-ratio perturbation (that is, richer than stoichiometry), the first group of cylinders may be fueled to be richer than stoichiometry and the second group of cylinders may be fueled to be leaner than stoichiometry, a degree of richness of the first group of cylinders selected to be higher than the degree of leanness of the second group of cylinders. As a result, the mixture of the first portion and the second portion reaching the upstream catalyst may be at or around the target rich AFR. Similarly, when the target air-fuel ratio perturbation at the upstream catalyst includes a leaner air-fuel-ratio perturbation, the first group of cylinders may be fueled to be leaner than stoichiometry and the second group of cylinders may be fueled to be richer than stoichiometry, a degree of leanness of the first group of cylinders selected to be higher than the degree of richness of the second group of cylinders. As a result, the mixture of the first portion and the second portion reaching the upstream catalyst may be at or around the target lean AFR. A multiplier may be used for regulating fueling via each injector such that the amount of fuel injected via each injector may be adjusted to maintain the target air-fuel-ratio perturbation.

At 422, the routine includes determining if further exhaust heat recovery is desired. In one example, the engine temperature may have reached an optimal operating temperature and further engine heating may not be desired. Also, exhaust heat recovery may no longer be requested when the vehicle cabin temperature reaches the requested temperature.

If it is determined that further exhaust heat recovery is desired, at 424, the heat exchange system may continue to be operated in the second mode and heat may continue to be recovered from at least a portion of the exhaust until the coolant temperature increases to the threshold temperature. If it is confirmed that exhaust heat recovery is no longer desired, the routine may proceed to step 426.

At 426, the routine includes determining if EGR is desired. EGR demand may be estimated based on engine operating conditions including engine speed and engine load. The controller may determine the EGR requirement through a determination that directly takes into account determined engine speed, engine load, engine temperature, etc., such as increasing the EGR amount as the engine load increases in the low-mid load region, and then decreasing the EGR amount as the engine load increases in the mid-high load region. The controller may alternatively determine the EGR requirement by referring a look-up table stored in the controller's memory, the look-up table having input being engine speed and engine load, and the output being an EGR amount or an EGR valve position (or degree of opening) corresponding to the EGR amount.

If it is determined that EGR is not desired based on current engine operating conditions, at 428, the exhaust system may be operated in the first mode by actuating the diverter valve to the first position while maintaining the EGR valve closed. In the first mode, the exhaust may not enter the bypass passage and may flow directly to the tailpipe via the catalysts. Also, the exhaust system may be transitioned to operate in the first mode during a higher than threshold engine load conditions. If during higher load conditions, the exhaust system is operated in the second mode, engine performance may be adversely affected due to increased exhaust back pressure that results in an increase in pumping work causing reduced brake output. Further, if heat recovery is continued during higher load conditions, there may be coolant overheating and coolant system degradation.

If it is confirmed that EGR is desired for engine operations, in response to the request for EGR, at 430, the exhaust system may be operated in the third mode. Operating in the third mode, as described in relation to FIG. 1C, includes at 431, actuating the EGR valve to an open position, and at 432, shifting the diverter valve to the first, fully closed position. The degree of opening of the EGR valve may be adjusted based on the EGR demand.

At 434, based on the EGR demand (as estimated in step 416), a requested first amount of exhaust may be recirculated to the intake manifold via the heat exchanger and the EGR delivery passage, the requested amount of EGR cooled at the heat exchanger while a second (remaining) amount of exhaust may be routed directly to the catalysts via the main exhaust passage without being cooled at the heat exchanger. In this mode, the heat exchanger may operate as an EGR cooler. In one example, a ratio of the first portion of exhaust (delivered as EGR) to the second portion of exhaust (directly flowing to tailpipe) may be determined based on each of EGR demand and the temperature of at least the upstream catalyst relative to its light-off temperature, the first portion may be decreased and the second portion may be correspondingly increased as a temperature of at least the upstream catalyst decreases to below its light-off temperature. The first portion may be increased and the second portion may be correspondingly decreased as the temperature of at least the upstream catalyst increases (above its light-off temperature) and EGR demand increases. In another example, the ratio of the first portion of exhaust to the second portion of exhaust may be determined solely based on EGR demand, the first portion may be increased, and the second portion may be correspondingly decreased with an increase in EGR demand. The first portion may be decreased and the second portion may be correspondingly increased as EGR demand decreases. The opening of the EGR valve may be regulated based on the first portion relative to the second portion, the opening increased as the first portion increases, and the opening decreased as the first portion decreases.

In this way, a single pre-catalyst heat exchanger may be utilized for exhaust heat recovery and EGR cooling while temperature of one or more exhaust catalysts is maintained above their activation temperatures.

Figure 5:
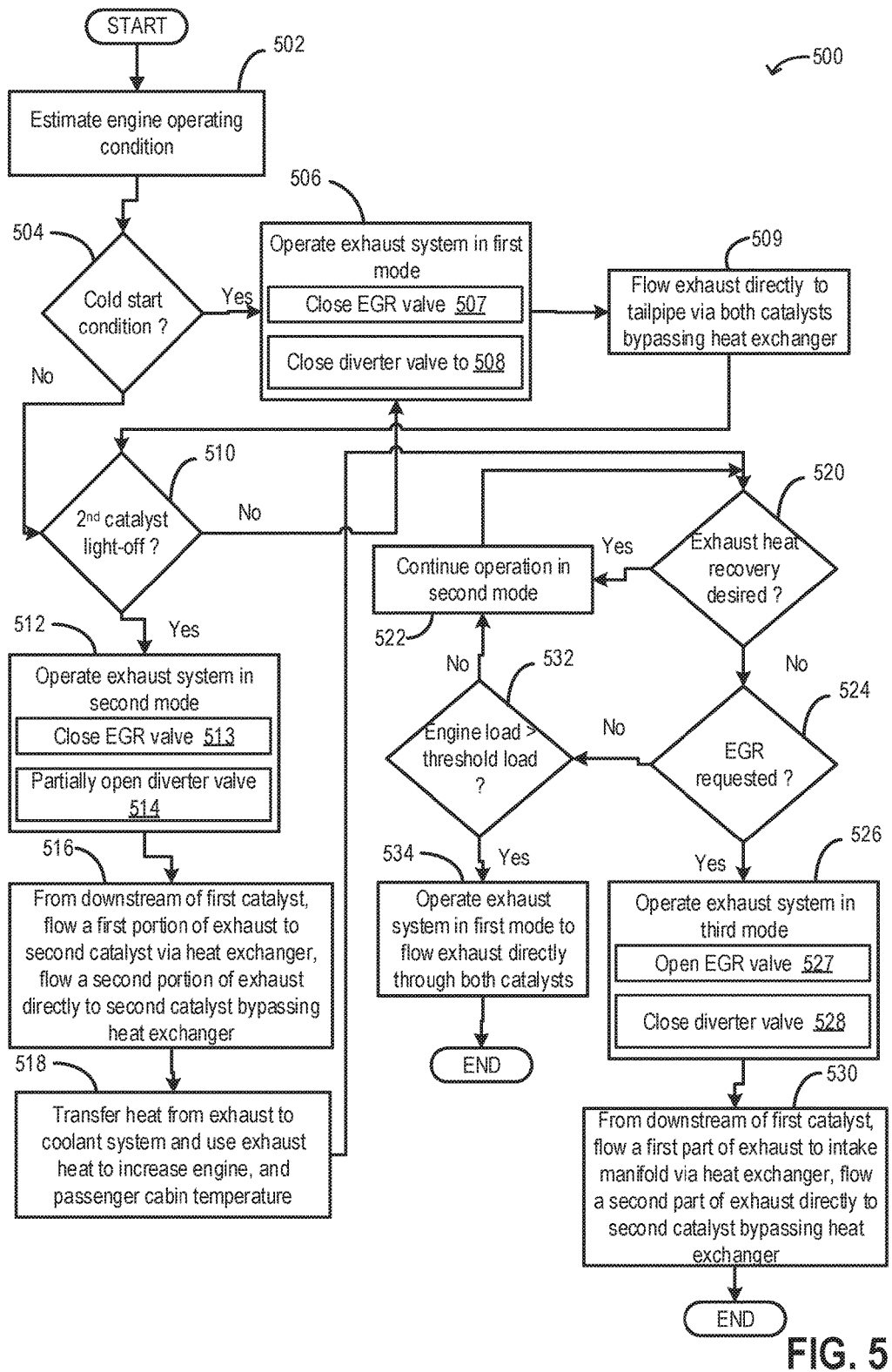
FIG. 5 shows a flow chart illustrating a second example method that may be implemented for adjusting exhaust flow through the heat exchange system of FIGS. 2A-2C.

FIG. 5 illustrates a first example method 500 that may be implemented for adjusting exhaust flow through the bypass assembly in the second embodiment of the heat exchange system as shown in FIGS. 2A-2C.

At 502, the routine includes estimating and/or measuring engine operating conditions. Conditions assessed may include, for example, engine temperature, engine load, driver torque demand, engine speed, throttle position, exhaust pressure, exhaust air-fuel-ratio, ambient conditions including ambient temperature, pressure, and humidity, MAP, MAF, boost, etc.

At 504, the routine includes determining if the vehicle engine is operating under cold-start conditions. An engine cold-start condition may be confirmed when the engine is started after a prolonged period of engine inactivity, when the engine temperature is lower than a threshold (such as below an exhaust catalyst light-off temperature), and while ambient temperatures are below a threshold. During cold-start conditions, expedited heating of exhaust catalysts may be desired for improved emissions quality while exhaust gas recirculation (EGR) may not be desired for optimal engine operations.

If engine cold-start conditions are confirmed, the routine moves to 506 in order to operate the heat exchange system in the first operating mode. Operating in the first mode, as described in relation to FIG. 2A, includes at 507, actuating the EGR valve (such as EGR valve 52 in FIG. 2A) to a closed position, and at 508, shifting a diverter valve (such as diverter valve 275 in FIG. 2A) coupled to a junction of the bypass passage (such as bypass passage 274 in FIG. 2A), and the main exhaust passage to a first (fully closed) position.

Due to the fully closed position of the diverter valve, at 509, the entire volume of exhaust exiting the first exhaust after-treatment device (such as first exhaust after-treatment device 270 in FIG. 2A) may not enter the bypass passage but may flow downstream through the main exhaust passage to the second exhaust after-treatment device (such as second exhaust after-treatment device 271 in FIG. 2A). The heat from the exhaust may be used to increase the temperatures of both the exhaust after-treatment devices (catalysts), thereby expediting attainment of catalyst light-off temperature. By expediting attainment of catalyst light-off temperature by using exhaust heat, the need for spark retard may be reduced, thereby increasing fuel efficiency of the engine while improving emissions quality.

At 510, the routine includes determining if the second exhaust after-treatment device has attained its light-off temperature. Once each of the first exhaust after-treatment device and the second exhaust after-treatment device attain their respective light-off temperatures, the catalysts may operate optimally providing improved emissions quality. Exhaust may first flow through the first exhaust after-treatment device (before flowing through the heat exchanger) during operation of the heat exchange system in each of the first, second, and third mode. Therefore, mode selection in the mid-catalyst embodiment of the heat exchange system may not be directly related to the temperature of the first exhaust after-treatment device. Also, if (at 504) it is determined that the engine is not operating under cold-start conditions such as during a hot-start condition, the routine may directly proceed to step 510.

If it is confirmed that the second exhaust catalyst has not yet attained the light-off temperature, the routine may move to step 506 to operate the exhaust system in the first mode to flow exhaust directly through both the exhaust catalysts until second the exhaust catalyst has attained its light-off temperatures and is completely operational. If it is confirmed that the second exhaust catalyst has attained its light-off temperatures, at 512, the exhaust system may be operated in the second mode. Operating in the second mode, as described in relation to FIG. 2B, includes, at 513, maintaining the EGR valve in the closed position and at 514, shifting the diverter valve to a second position (partially open). In the second position, the opening of the diverter valve may be varied to adjust the amount of exhaust entering the bypass passage.

Due to the second position of the diverter valve, at 516, a first portion of exhaust exiting the first exhaust after-treatment device may enter the bypass passage, flow through the heat exchanger, and then return to the main exhaust passage upstream of the second exhaust after-treatment device. A second portion of the exhaust may not enter the bypass passage, and may directly flow from downstream of the first exhaust after-treatment device to the second exhaust after-treatment device, bypassing the heat exchanger. Heat from the second portion of the exhaust may be used for maintaining the operating temperature of the second exhaust after-treatment device above its light-off temperature. A ratio of the first portion (routed via the heat exchanger) to the second portion (routed bypassing the heat exchanger) may be based on a temperature of the second exhaust catalyst relative to an activation temperature of the second exhaust catalyst. The first portion may be decreased and the second portion may be correspondingly increased as the temperature of the second exhaust catalyst decreases to below the activation temperature. Similarly, the first portion may be increased for increased exhaust heat recovery and the second portion may be correspondingly decreased as the temperature of the second exhaust catalyst increases to above the activation temperature. Opening of the diverter valve may be adjusted based on the first portion, the opening increased as the first portion is increased and the opening decreased as the first portion is decreased. As an example, if the temperature of the second exhaust catalyst decreases significantly below its light-off temperature (such as below a threshold temperature), the diverter valve may be fully closed to flow the entire volume of exhaust from the first exhaust catalyst to the second exhaust catalyst without any exhaust flow through the heat exchanger (no exhaust heat recovery).

At 518, during exhaust flow through the heat exchanger, exhaust heat may be recovered at the heat exchanger. Specifically, heat from the exhaust may be transferred to a coolant circulating through the heat exchanger. Exhaust heat can be used to warm the coolant circulating through the heat exchanger, and the warmed coolant can then be circulated through the engine and/or through a heater core so that the heat can be utilized for heating other components of the vehicle system. For example, if cabin heating is requested by the vehicle operator due to the vehicle cabin temperature being lower than a desired temperature, warmed coolant may be circulated through the heater core and cabin heating may be provided. Thus, based on cabin heating demands, as requested by a vehicle operator (e.g., based on a cabin temperature setting), heat may be transferred from the heater core to the cabin. For example, air may be drawn into the cabin via the heater core, thereby enabling the cabin to be warmed. The warmed coolant may also be circulated to an engine block and cylinder head to raise engine temperatures, thereby improving engine performance during cold conditions.

At 520, the routine includes determining if further exhaust heat recovery is desired. In one example, the engine temperature may have reached an optimal operating temperature and further engine heating may not be desired. Also, exhaust heat recovery may no longer be requested when the vehicle cabin temperature reaches the requested temperature.

If it is determined that continued exhaust heat recovery is desired, at 522, the exhaust system may be continued to be operated in the second mode and heat may be continued to be recovered from the first portion of the exhaust until the coolant temperature increased to the threshold temperature. If it is determined that no further exhaust heat recovery is desired, the routine may proceed to step 524.

At 524, the routine includes determining if EGR is requested for engine operations. EGR may be desired after the exhaust catalyst(s) have attained their respective light-off temperature(s), and are optimally functional. EGR may be requested to attain a desired engine dilution, thereby improving fuel efficiency and emissions quality. An amount of EGR requested may be based on engine operating conditions including engine load, engine speed, engine temperature, etc. For example, the controller may refer a look-up table having the engine speed and load as the input, and having a signal corresponding to a degree of opening to apply to the EGR valve as the output, the degree of opening providing a dilution amount corresponding to the input engine speed-load. In still other examples, the controller may rely on a model that correlates the change in engine load with a change in the engine's dilution requirement, and further correlates the change in the engine's dilution requirement with a change in the EGR requirement. For example, as engine load increases from a low load to a mid-load, EGR requirement may increase, and then as engine load increases from a mid-load to a high load, EGR requirement may decrease.

If it is determined that EGR is not requested based on current engine operating conditions, at 532, the routine includes determining if the engine load is higher than a threshold engine load. The threshold engine load may correspond to an engine load during which a higher volume of exhaust may be produced and the entire volume of exhaust may not be optimally treated by one catalyst. Also, in order to improve functionality of the second catalyst, a higher temperature may be maintained at the second catalyst and in order to maintain the higher temperature at the second catalyst, the entire volume of exhaust may be directly routed to the second catalyst (without heat recovery). Further, in order to maintain functionality of both the exhaust catalysts, a target air-fuel ratio perturbation may be maintained at both the catalysts.

If it is determined that the engine load is lower than the threshold load, the routine may proceed to step 522 and the exhaust system may be continued to be operated in the second mode with a first portion of exhaust routed to the second catalyst via heat exchanger and a second portion of exhaust routed directly to second catalyst bypassing heat exchanger.

If it is determined that the engine is operating with a higher than threshold load, at 534, the exhaust system may be operated in the first mode. The diverter valve may be actuated to the first position and the EGR valve may be closed to enable direct exhaust flow from the first exhaust after-treatment device (first catalyst) to the second exhaust after-treatment device (second catalyst) bypassing the heat exchanger. By flowing exhaust directly to the second catalyst, a higher temperature may be maintained at the second catalyst for optimal operation at higher load conditions. By directly routing exhaust through both the catalysts, a target air-fuel-ratio perturbation of exhaust reaching each of the catalysts may be maintained, thereby maintaining catalyst functionality. Instead of routing exhaust directly, if a first portion of the exhaust is routed from the first catalyst to the second catalyst via the bypass passage, while a second, remaining portion is directly routed from the first catalyst to the second catalyst, the two portions of the exhaust entering the second catalyst may flow through two different routes. The difference in routes between the two portions may result in unintended changes in the desired air-fuel-ratio perturbation of exhaust reaching the second catalyst which may adversely affect the operation of the second exhaust catalyst during higher volume exhaust flow such as during higher load conditions. Also, if during higher load conditions, the exhaust system is operated in the second mode, engine performance may be adversely affected due to increased exhaust back pressure that results in an increase in pumping work causing reduced brake output. Further, if heat recovery is continued during higher load conditions, there may be coolant overheating and coolant system degradation.

Therefore, by flowing exhaust directly from the first catalyst to the second catalyst, emissions quality may be improved during higher load engine conditions.

If at 524 it is determined that EGR is requested for engine operations, at 526, the exhaust system may be operated in the third mode. Operating in the third mode, as described in relation to FIG. 2C, includes, at 527, actuating the EGR valve to an open position, and at 528, shifting the diverter valve to the first (closed) position. The opening of the EGR valve may be regulated based on the amount of EGR requested. Due to the opening of the EGR valve (based on the amount of EGR requested), a first part of exhaust exiting the first catalyst may enter the bypass passage, and flow through the heat exchanger before entering the EGR delivery passage. In this mode, the heat exchanger may operate as an EGR cooler. The EGR may then be delivered to the engine intake manifold via the EGR delivery passage. A second portion of exhaust may not enter the bypass passage and may flow directly through the main exhaust passage to the tailpipe via the second catalyst, bypassing the heat exchanger. The ratio of the first portion of exhaust (delivered as EGR) to the second portion of exhaust (directly flowing to tailpipe) may be determined based on the amount of EGR requested for optimal engine operations. The first portion may be increased and the second portion may be correspondingly decreased with an increase in the amount of EGR requested. Similarly, the second portion may be increased and the first portion may be correspondingly decreased with a decrease in the amount of EGR requested. The opening of the EGR valve may be regulated based on the ratio of the first portion to the second portion.

In this way, during engine cold-start conditions, a diverter valve coupled to an exhaust bypass may be actuated to a fully closed position and an EGR valve may be closed to enable exhaust flow from downstream of a first exhaust catalyst to upstream of a second exhaust catalyst via a main exhaust passage. After activation of at least the second exhaust catalyst, the diverter valve may be actuated to a partially open position and the EGR valve may be closed to enable a first portion of exhaust to flow from downstream of the first exhaust catalyst to upstream of the second exhaust catalyst via a heat exchanger housed in a bypass passage arranged parallel to the main exhaust passage, and a second, remaining portion of exhaust to flow from downstream of the first exhaust catalyst to upstream of the second exhaust catalyst via the main exhaust passage, the first portion and the second portion of exhaust combining upstream of the second exhaust catalyst and then flowing through the second exhaust catalyst. While flowing exhaust via the heat exchanger, exhaust heat may be transferred to a coolant circulating through the heat exchanger, and then heat from the coolant may be transferred to an engine block based on engine heating demand.

FIG. 7 shows an example operating sequence 700 illustrating operation of the heat exchange systems of FIGS. 1A-1C during different engine operating conditions. Exhaust flow through the bypass passage may be regulated based on engine operating conditions and corresponding exhaust gas recirculation (EGR) demands. The horizontal (x-axis) denotes time and the vertical markers t1-t6 identify significant times in the operation of the heat exchange system.

The first plot, line 702, shows variation in engine load as driver demand changes, the driver demand estimated via a pedal position sensor over time. The second plot, line 704, shows change in engine temperature as estimated via an engine coolant temperature sensor, over time. The third plot, line 706, shows vehicle cabin temperature as estimated via a cabin temperature sensor. The fourth plot, line 708, shows engine EGR flow corresponding to EGR demand as shown by dotted line 709. The fifth plot, line 710, shows fueling schedule (amount of fuel injected in lb m) of a first group of engine cylinders and the sixth plot, line 712, shows fueling schedule (amount of fuel injected in lb m) of a second group of engine cylinders. The seventh plot, line 714, shows an air-fuel-ratio of exhaust entering a first catalyst upstream of the bypass passage.

The eighth plot, line 716, shows a position of a diverter valve coupled to a junction of the main exhaust passage and the bypass passage, downstream of a heat exchanger.

Prior to time t1, the engine is shut down and the vehicle is not propelled using engine torque. At time t1, in response to an operator torque demand, the engine starts from rest after a period of inactivity. At the time of the engine start, the engine temperature may be lower than the threshold temperature 705. Based on the lower than threshold engine temperature, engine cold-start conditions are inferred. Due to the lower than threshold engine temperature at the cold-start, the temperature of the exhaust catalysts may be lower than their light-off temperatures, and catalyst heating may be desired in order to expedite attainment of their respective light-off temperatures. During cold-start conditions, EGR may not be desired for engine operations, therefore an EGR valve (regulating EGR flow to the intake manifold) may be maintained in the closed position, and exhaust may not flow from the exhaust passage to the engine intake manifold. During this time, the diverter valve may be closed such that exhaust may not enter the bypass passage, and may directly flow through the first and second exhaust catalyst, wherein heat from the exhaust may be used to increase the temperature of both the catalysts, thereby expediting the attainment of their respective light-off temperatures. After flowing through the catalysts, the exhaust may be released to the atmosphere via the tailpipe. Between time t1 and t2, as the exhaust flows directly to the first catalyst, the target air-fuel-ratio perturbation reaching the catalyst may be maintained without any adjustments to the fueling schedule of the first and second group of cylinders. The air fuel ratio perturbations may vary with engine load, the frequency of perturbations increasing with increase in engine load. During this time, the engine load may be below the threshold load.

At time t2, based on inputs from exhaust temperature sensors it may be inferred that the catalysts have attained their respective light-off temperatures. Also, it may be inferred from the engine coolant temperature sensor that the engine temperature has increased to above the threshold hold temperature. However, at this time, it may be determined that cabin heating has been requested. In order to recover heat from the exhaust and use the heat for cabin heating, the controller may send a signal to an actuator coupled to the diverter valve to partially open the valve in order to flow a first portion of exhaust exiting the turbine into the bypass passage and through the heat exchanger while flowing a second (remaining) portion of the exhaust directly to the catalyst (bypassing the heat exchanger). The degree of opening of the diverter valve may be adjusted based on the temperature of at least the first catalyst relative to the light-off temperature of the first catalyst in order to adjust the amount of exhaust entering the bypass passage. As such, the opening of the diverter valve may be decreased (to decrease the first portion) with a decrease in the temperature of the first catalyst relative to its light-off temperature. By decreasing the first portion, a higher amount of hot exhaust may be routed through the first catalyst resulting in increase of the catalyst's temperature to above its light-off temperature. Heat from the exhaust may be transferred to a coolant circulating through the heat exchanger, and the heated coolant may then be circulated through a heater core. Heat from the coolant may be transferred to the heater core and may be further used for vehicle cabin warm-up. The coolant with the exhaust heat may also be circulated through the engine to maintain the engine temperature. Between time t2 and t3, first portion of the exhaust entering the catalysts flows through a longer route via the heat exchanger compared to the second portion of the exhaust that flows directly to the catalysts, therefore in order to maintain desired air fuel ratio perturbations, a multiplier is used for regulating the amount of fuel injected to each of the first and second group of cylinders. The amount of fuel injected to the first group of cylinders may be lower than fuel injected to the second group of cylinders. By adjusting the fueling schedule, it may be observed that the air fuel ratio perturbations reaching the catalyst is maintained. The target air-fuel ratio perturbation may be maintained by adjusting fueling of the first group of cylinders relative to fueling of the second group of cylinders. The controller may send a signal to a first set of fuel injectors coupled to the first group of cylinders and to a second set of fuel injectors coupled to the second group of cylinders to adjust the fueling schedule (such as fueling pulse-width). By maintaining the target air-fuel-ratio perturbation at the first catalyst, catalyst functionality may be maintained. Fueling schedule of the first group of cylinders and the second group of cylinders may be adjusted based on input from each of a first oxygen sensor positioned upstream of the heat exchanger (indicative of an air-fuel ratio of exhaust prior to entering the bypass passage) and a second oxygen sensor positioned downstream of the heat exchanger (indicative of an air-fuel ratio of the first portion of exhaust mixed with the second portion of exhaust).

In an alternate embodiment of the exhaust system embodiments where the heat exchanger is positioned in a mid-catalyst location, between the first and the second catalyst, between time t2 and t3, the first portion of exhaust exiting the first catalyst may flow through the heat exchanger coupled to the bypass passage and then return to the main exhaust passage upstream of the second catalyst, while the second portion of exhaust flows from the first catalyst directly to the second catalyst. After returning to the main exhaust passage, the first and the second portions may combine and flow to the tailpipe via one or more exhaust catalysts. For the mid-catalyst embodiment, during lower than threshold engine load conditions, as exhaust is primarily treated by the first catalyst as the target air-fuel-ratio perturbation in exhaust reaches the first catalyst, fueling may not be adjusted on a per-cylinder basis to maintain the target air-fuel-ratio perturbation at the second catalyst.

At time t3, the cabin temperature may increase to above the desired temperature, and it may be inferred that further heating of the cabin is not desired. Also, the engine temperature may continue to be higher than the threshold temperature. Therefore, recovery of exhaust heat at the heat exchanger may no longer be desired. Also, due to a change in engine load from low load to mid-load conditions, EGR may be requested. The controller may determine the desired EGR level (as shown by dotted line 709) through a determination that directly takes into account engine operation conditions such as engine speed, engine load, engine temperature, etc., such as increasing the EGR amount as the engine load increases in the low-mid load region, and then decreasing the EGR amount as the engine load increases in the mid-high load region. The controller may alternatively determine the EGR requirement by referring a look-up table stored in the controller's memory, the look-up table having input being engine speed and engine load, and the output being an EGR amount or an EGR valve position (or degree of opening) corresponding to the EGR amount. In order to supply a desired amount of EGR from the exhaust passage to the intake manifold, the EGR valve may be opened while shifting the diverter valve to a closed position. Between time t3 and t4, a portion of exhaust may enter the bypass passage and then flow via the heat exchanger before entering the intake manifold via the EGR valve and the EGR delivery passage. The opening of the EGR valve may be adjusted based on the amount of EGR desired for optimal engine operations. While flowing through the heat exchanger, the EGR may be cooled. The remaining portion of exhaust (not entering the bypass passage) may flow downstream to the tailpipe via the catalyst(s). During this time, as the exhaust directly flows to the first catalyst flows through the main exhaust passage, the target air-fuel-ratio perturbation reaching the catalyst may be maintained without any adjustments to the fueling schedule of the first and second group of cylinders.

At time t4, the engine load may increase to above the threshold load 703 and higher engine power may be desired for engine operations. Due to the increase in the requested engine power output, EGR may no longer be desired for engine operations and the EGR valve may be actuated to the closed position. At this time, each of the engine temperature, and the cabin temperature is above the respective threshold, and exhaust heat recovery may no longer be requested. In order to maintain a target air-fuel ratio perturbation without any adjustments to the fueling schedules of the first and second group of cylinders at each of the exhaust catalysts, between t4 and t5, the diverter valve may be maintained in the closed position to enable the entire volume of exhaust to be routed directly through each of the exhaust catalysts bypassing the heat exchanger. By flowing the entire volume of exhaust directly through the catalysts, the desired chemical composition of the exhaust reaching each of the catalysts may be maintained, thereby increasing catalyst functionality. Between time t4, and t5, exhaust may not enter the bypass passage, and the EGR delivery passage, and may be directly released to the atmosphere via the catalysts and the tailpipe. The higher volume of exhaust produced during the higher engine load conditions may be treated by both the catalysts before they are routed to the tailpipe. During this time, due to the increased engine load, there may be an increase in the air fuel ratio perturbations.

At time t5, an engine shut-down request may be received from the operator and between time t5 and t6, the engine may not be operated and fuel injection may be suspended. At time t6, an engine restart request is received responsive to which the engine starts from rest. Herein the engine is restarted after a shorter duration since the last shut-down, therefore an engine hot-start is inferred with engine temperature above the threshold temperature 705. At this time, cabin heating may be requested by the operator. Therefore, the diverter valve may be partially opened to route a portion of exhaust via the heat exchanger wherein the exhaust heat may be extracted by a coolant which may then circulate through the heater core in order to provide heat to the vehicle cabin. The remaining fraction of exhaust may flow directly through the catalysts, and provide heat to maintain the temperature of the catalysts above their respective light-off temperatures. The opening of the diverter valve may be adjusted based on the amount of exhaust desired for maintenance of catalyst temperature at a desired level. As such, the degree of opening of the diverter vale after time t6 may be different from the degree of opening of the diverter valve between time t2 and t3. Also, during this time, fueling schedule of the first group of cylinders and the second group of cylinders may be adjusted to maintain the target exhaust air-fuel-ratio perturbation at the upstream catalyst. The controller may send a signal to the fuel injectors to decrease the amount of fuel injected to the first group of cylinders relative to the amount of fuel injected to the second group of cylinders. During the hot-start condition, EGR may not be desired for engine operations and the EGR valve may be maintained in the closed position.

An example engine method comprises: flowing a first portion of exhaust into an upstream exhaust catalyst via a heat exchanger in a bypass passage, flowing a second, remaining portion of exhaust into the upstream exhaust catalyst via a main exhaust passage arranged parallel to the bypass passage, and adjusting fueling on a per-cylinder basis as a function of the first portion relative to second portion to provide a target exhaust air-fuel-ratio at the upstream catalyst. Any preceding example further comprises, additionally or optionally, combining the first portion and the second portion of exhaust at the upstream catalyst, and flowing the combined exhaust through the upstream exhaust catalyst and then through a downstream exhaust catalyst. In any or all of the preceding examples, additionally or optionally, the flowing is responsive to each of the upstream exhaust catalyst exceeding a first activation temperature and the downstream catalyst exceeding a second activation temperature, the second activation temperature lower than the first activation temperature, and wherein the first portion is selected to maintain each of the upstream exhaust catalyst at or above the first activation temperature and the downstream exhaust catalyst at or above the second activation temperature. Any or all of the preceding examples further comprises, additionally or optionally, responsive to at least the upstream exhaust catalyst being below the first activation temperature, flowing an entire volume of exhaust to the upstream exhaust catalyst while bypassing the heat exchanger. In any or all of the preceding examples, additionally or optionally, the first portion is decreased, and the second portion is correspondingly increased as a temperature of at least the upstream catalyst decreases. In any or all of the preceding examples, additionally or optionally, flowing the first portion and the second portion includes actuating a diverter valve coupled at a junction of the main exhaust passage and an outlet of the bypass passage to an open position to enable exhaust flow from the exhaust bypass to the main passage, a degree of opening of the diverter valve increased as the first portion increases relative to the second portion. In any or all of the preceding examples, additionally or optionally, adjusting the fueling on a per-cylinder basis is based on input from each of a first oxygen sensor positioned upstream of the heat exchanger in the main exhaust passage and a second oxygen sensor positioned downstream of the heat exchanger in the main exhaust passage. In any or all of the preceding examples, adjusting the fueling as a function of the first portion relative to the second portion additionally or optionally, includes adjusting based on a transport delay of the first portion of the exhaust through the bypass passage relative to the transport delay of the second portion of the exhaust through the main exhaust passage, and wherein the target exhaust air-fuel ratio at the upstream catalyst includes a target air-fuel ratio perturbation at the upstream catalyst. In any or all of the preceding examples, additionally or optionally, the first portion of exhaust includes exhaust received at a first timing from a first group of cylinders and wherein the second portion of exhaust includes exhaust received at a second timing from a second, different group of cylinders, and wherein when the target air-fuel ratio perturbation at the upstream catalyst includes a rich air-fuel-ratio perturbation, fueling the first group of cylinders to be richer than stoichiometry and fueling the second group of cylinders to be leaner than stoichiometry, a degree of richness of the first group of cylinders higher than the degree of leanness of the second group of cylinders. In any or all of the preceding examples, additionally or optionally, the engine is coupled in a vehicle having a cabin, and the method further comprises: transferring heat from the first portion of exhaust to coolant flowing through the heat exchanger; and flowing heated coolant through an engine block and a heater core to heat the engine based on engine heating demand and heat the cabin based on a cabin heating demand. Any or all of the preceding examples further comprises, additionally or optionally, during request for exhaust gas recirculation (EGR), adjusting actuating a position of the diverter valve to a fully closed position to disable exhaust flow from the exhaust bypass to the main exhaust passage, and opening an EGR valve coupled to an EGR delivery passage coupled to the exhaust bypass downstream of the heat exchanger to flow a third portion of exhaust to engine intake manifold via an EGR delivery passage coupled to the exhaust bypass, downstream of the heat exchanger, the heat exchanger, and a fourth portion of exhaust directly to the upstream catalyst. In any or all of the preceding examples, additionally or optionally, a ratio of the third portion to the fourth portion is adjusted based on each of EGR demand and the temperature of at least the upstream catalyst, the third portion is decreased and the fourth portion is correspondingly increased as a temperature of at least the upstream catalyst decreases, an opening of the EGR valve adjusted based on the third portion.

Another example method comprises: during engine cold-start conditions, actuating a diverter valve coupled to a bypass passage to a fully closed position and closing an EGR valve to enable exhaust flow from downstream of a first exhaust catalyst to upstream of a second exhaust catalyst via a main exhaust passage, after activation of at least the second exhaust catalyst, actuating the diverter valve to a partially open position and closing the EGR valve to enable a first portion of exhaust to flow from downstream of the first exhaust catalyst to upstream of the second exhaust catalyst via a heat exchanger housed in the bypass passage, and a second, remaining portion of exhaust to flow from downstream of the first exhaust catalyst to upstream of the second exhaust catalyst via the main exhaust passage, the first portion and the second portion of exhaust combining upstream of the second exhaust catalyst and then flowing through the second exhaust catalyst. In any of the preceding examples, additionally or optionally, a ratio of the first portion to the second portion is based on a temperature of the second exhaust catalyst relative to an activation temperature of the second exhaust catalyst and an opening of the diverter valve is adjusted based on the first portion, the opening increased as the first portion is increased and wherein flowing exhaust via the heat exchanger includes transferring exhaust heat to a coolant circulating through the heat exchanger, and then transferring heat from the coolant to an engine block based on engine heating demand. In any or all of the preceding examples, additionally or optionally, the first portion is decreased and the second portion is correspondingly increased as the temperature of the second exhaust catalyst decreases to below the activation temperature. Any or all of the preceding examples further comprises, additionally or optionally, in response to a demand for exhaust gas recirculation, actuating the diverter valve to the fully closed position and opening the EGR valve to enable a third portion of exhaust to flow from downstream of the first exhaust catalyst to an engine intake via the heat exchanger and a fourth, remaining portion of exhaust to flow from downstream of the first exhaust catalyst to upstream of the second exhaust catalyst via the main exhaust passage, the third portion adjusted with respect to the fourth portion based on EGR demand, wherein the third portion is increased as the EGR demand increases. Any or all of the preceding examples further comprises, additionally or optionally, in response to each of a higher than threshold engine load and a higher than threshold engine temperature, actuating the diverter valve to the fully closed position and closing the EGR valve to enable exhaust flow from downstream of the first exhaust catalyst to upstream of the second exhaust catalyst via the main exhaust passage bypassing the heat exchanger.

In yet another example, an engine system comprises: an engine intake manifold, an engine exhaust system with an exhaust passage and a heat exchange system, the exhaust passage including an exhaust humidity sensor, an exhaust temperature sensor, an exhaust pressure sensor, one or more exhaust catalysts, and a muffler, the bypass passage coupled to the exhaust passage from upstream of the one or more catalysts to upstream of the muffler, the heat exchange system including a bypass passage housing a heat exchanger, a coolant system fluidly coupled to the heat exchanger, an engine block, and a heater core, the coolant system including an engine coolant temperature sensor, a diverter valve coupling an outlet of the bypass passage to the exhaust passage, an exhaust gas recirculation (EGR) passage with an EGR valve for recirculating exhaust from the bypass passage, downstream of the heat exchanger, to the intake manifold, a first oxygen sensor coupled to the exhaust passage upstream of the heat exchanger and a second oxygen sensor coupled to the exhaust passage downstream of the heat exchanger. The engine system further comprises a controller with computer readable instructions stored on non-transitory memory for: estimating engine temperature via the engine coolant temperature sensor, and catalyst temperature via the exhaust temperature sensor, and in response to a lower than threshold catalyst temperature, closing each of the EGR valve and the diverter valve to flow exhaust directly to the one or more catalysts, and in response to a higher than threshold catalyst temperature and at least one of a lower than threshold engine temperature and a lower than requested vehicle cabin temperature, partially opening the diverter valve to flow a first amount of exhaust from the exhaust manifold to the one or more catalysts via the heat exchanger while flowing a second, remaining amount directly to the one or more catalysts, bypassing the heat exchanger. In any preceding example, additionally or optionally, the controller contains further instructions for: estimating a first exhaust air-fuel-ratio based on input from the first oxygen sensor, estimating a second air-fuel-ratio based on input from the second oxygen sensor, and adjusting a cylinder-to-cylinder air-fuel-ratio based on each of the first air-fuel-ratio and the second air-fuel-ratio to maintain a target amplitude and frequency of air-fuel-ratio perturbation in the exhaust reaching the one or more catalysts, the adjusting including operating a first group of cylinders richer than stoichiometry while operating a second group of cylinders leaner than stoichiometry, wherein a degree of richness of the first group of cylinders and a degree of leanness of the second group of cylinders is based on the target amplitude and frequency of the air-fuel-ratio perturbation. In any or all of the preceding examples, additionally or optionally, the controller includes further instructions for: in response to a request for EGR, opening the EGR valve and closing the diverter valve to recirculate a requested amount of exhaust to the intake manifold via the heat exchanger, the requested amount of EGR cooled at the heat exchanger while a remaining amount of exhaust is routed directly to the one or more catalysts without being cooled at the heat exchanger.

In this way, EGR cooling and exhaust heat recovery may be effectively carried out by using a single heat exchanger coupled to an exhaust bypass passage upstream of exhaust catalysts or mid-way between two exhaust catalysts. By routing exhaust through the catalysts while bypassing the heat exchanger during cold-start conditions, catalyst light-off may be expedited, and cold-start emissions quality may be improved. By routing a part of the exhaust through the heat exchanger after catalyst light-off, exhaust heat recovery is increased, while the temperatures of the catalysts are maintained above their respective light-off temperature by using heat from the remaining part of the exhaust. In pre-catalyst heat exchanger configurations, the technical effect of adjusting the cylinder-to-cylinder air-fuel-ratio during exhaust flow through the heat exchanger is that a target air-fuel ratio perturbation of exhaust entering the upstream catalyst may be maintained, thereby improving catalyst functionality. In mid-catalyst heat exchanger configurations, by flowing exhaust directly through both the catalysts during higher engine load conditions, the target air-fuel ratio perturbation may be maintained at both the catalysts. By recovering exhaust heat, and providing cooled EGR using a common heat exchanger, component and cost reduction benefits are achieved. Overall, emissions quality, engine fuel economy, and engine performance may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
flowing a first portion of exhaust into an upstream exhaust catalyst via a heat exchanger in a bypass passage;
flowing a second, remaining portion of exhaust into the upstream exhaust catalyst via a main exhaust passage arranged parallel to the bypass passage; and
adjusting fueling on a per-cylinder basis as a function of the first portion relative to the second portion to provide a target exhaust air-fuel-ratio at the upstream exhaust catalyst, wherein the adjusting fueling on the per-cylinder basis is based on a transport delay of the first portion of exhaust through the bypass passage relative to a transport delay of the second portion of exhaust through the main exhaust passage.

2. The method of claim 1, further comprising combining the first portion and the second portion of exhaust at the upstream catalyst, and flowing the combined exhaust through the upstream exhaust catalyst and then through a downstream exhaust catalyst.

3. The method of claim 2, wherein the flowing is responsive to each of the upstream exhaust catalyst exceeding a first activation temperature and the downstream exhaust catalyst exceeding a second activation temperature, and wherein the first portion is selected to maintain each of the upstream exhaust catalyst at or above the first activation temperature and the downstream exhaust catalyst at or above the second activation temperature.

4. The method of claim 3, further comprising, responsive to at least the upstream exhaust catalyst being below the first activation temperature, flowing an entire volume of exhaust to the upstream exhaust catalyst while bypassing the heat exchanger.

5. The method of claim 3, wherein the first portion is decreased and the second portion is correspondingly increased as a temperature of at least the upstream exhaust catalyst decreases.

6. The method of claim 1, wherein flowing the first portion and the second portion includes actuating a diverter valve coupled at a junction of the main exhaust passage and an outlet of the bypass passage to an open position to enable exhaust flow from an exhaust bypass to the main exhaust passage, a degree of opening of the diverter valve increased as the first portion increases relative to the second portion.

7. The method of claim 6, further comprising, during a request for exhaust gas recirculation (EGR), actuating the diverter valve to a fully closed position to disable exhaust flow from the exhaust bypass to the main exhaust passage, and opening an EGR valve to flow a third portion of exhaust to an engine intake manifold via an EGR delivery passage coupled to the exhaust bypass, downstream of the heat exchanger, and a fourth portion of exhaust directly to the upstream exhaust catalyst.

8. The method of claim 7, wherein a ratio of the third portion to the fourth portion is adjusted based on each of EGR demand and a temperature of at least the upstream exhaust catalyst, the third portion is decreased and the fourth portion is correspondingly increased as the temperature of at least the upstream exhaust catalyst decreases, an opening of the EGR valve adjusted based on the third portion.

9. The method of claim 1, wherein the adjusting fueling on the per-cylinder basis is based on input from each of a first oxygen sensor positioned upstream of the heat exchanger in the main exhaust passage and a second oxygen sensor positioned downstream of the heat exchanger in the main exhaust passage.

10. The method of claim 1, wherein the target exhaust air-fuel-ratio at the upstream exhaust catalyst includes a target air-fuel-ratio perturbation at the upstream exhaust catalyst.

11. The method of claim 10, wherein the first portion of exhaust includes exhaust received at a first timing from a first group of cylinders and wherein the second portion of exhaust includes exhaust received at a second timing from a second, different group of cylinders, and wherein when the target air-fuel-ratio perturbation at the upstream exhaust catalyst includes a rich air-fuel-ratio perturbation, fueling the first group of cylinders to be richer than stoichiometry and fueling the second group of cylinders to be leaner than stoichiometry, a degree of richness of the first group of cylinders higher than a degree of leanness of the second group of cylinders.

12. The method of claim 1, wherein an engine is coupled in a vehicle having a cabin, the method further comprising:
transferring heat from the first portion of exhaust to coolant flowing through the heat exchanger; and
flowing heated coolant through an engine block and a heater core to heat the engine based on an engine heating demand and heat the cabin based on a cabin heating demand.

13. An engine system comprising:
an engine intake manifold;
an engine exhaust system with an exhaust passage and a heat exchange system, the exhaust passage including an exhaust humidity sensor, an exhaust temperature sensor, an exhaust pressure sensor, one or more exhaust catalysts, and a muffler, a bypass passage coupled to the exhaust passage from upstream of the one or more exhaust catalysts to upstream of the muffler, the heat exchange system including the bypass passage housing a heat exchanger;
a coolant system fluidly coupled to the heat exchanger, an engine block, and a heater core, the coolant system including an engine coolant temperature sensor;
a diverter valve coupling an outlet of the bypass passage to the exhaust passage;
an exhaust gas recirculation (EGR) passage with an EGR valve for recirculating exhaust from the bypass passage, downstream of the heat exchanger, to the engine intake manifold;
a first oxygen sensor coupled to the exhaust passage upstream of the heat exchanger and a second oxygen sensor coupled to the exhaust passage downstream of the heat exchanger; and
a controller with computer readable instructions stored on non-transitory memory for:
estimating engine temperature via the engine coolant temperature sensor and catalyst temperature via the exhaust temperature sensor, and, in response to a lower than threshold catalyst temperature, closing each of the EGR valve and the diverter valve to flow exhaust directly to the one or more exhaust catalysts; and
in response to a higher than threshold catalyst temperature and a lower than threshold engine temperature, opening the diverter valve to flow a first amount of exhaust from an exhaust manifold to the one or more exhaust catalysts via the heat exchanger while flowing a second, remaining amount of exhaust directly to the one or more exhaust catalysts, bypassing the heat exchanger.

14. The system of claim 13, wherein the controller contains further instructions for:
estimating a first exhaust air-fuel-ratio based on input from the first oxygen sensor, estimating a second air-fuel-ratio based on input from the second oxygen sensor, and adjusting a cylinder-to-cylinder air-fuel-ratio based on each of the first air-fuel-ratio and the second air-fuel-ratio to maintain a target amplitude and frequency of air-fuel-ratio perturbation in the exhaust reaching the one or more exhaust catalysts, the adjusting including operating a first group of cylinders richer than stoichiometry while operating a second group of cylinders leaner than stoichiometry, wherein a degree of richness of the first group of cylinders and a degree of leanness of the second group of cylinders is based on the target amplitude and frequency of the air-fuel-ratio perturbation.

15. The system of claim 13, wherein the controller includes further instructions for:
in response to a request for EGR, opening the EGR valve and closing the diverter valve to recirculate a requested amount of exhaust to the engine intake manifold via the heat exchanger, the requested amount of EGR cooled at the heat exchanger while a remaining amount of exhaust is routed directly to the one or more exhaust catalysts without being cooled at the heat exchanger.

\* \* \* \* \*